(12) United States Patent
Fisher et al.

(10) Patent No.: US 10,244,775 B1
(45) Date of Patent: Apr. 2, 2019

(54) DEVICE AND METHOD FOR DOSING CRYOGENIC LIQUID

(71) Applicant: Smitten Ventures, Inc., San Francisco, CA (US)

(72) Inventors: Robyn Sue Fisher, San Francisco, CA (US); David M Fischer, Palo Alto, CA (US); Jonathan Fischer, Palo Alto, CA (US); Whitfield Fowler, San Francisco, CA (US)

(73) Assignee: Smitten Ventures, Inc., San Francisco, CA (US)

( * ) Notice: Subject to any disclaimer, the term of this patent is extended or adjusted under 35 U.S.C. 154(b) by 0 days.

(21) Appl. No.: 15/256,287

(22) Filed: Sep. 2, 2016

Related U.S. Application Data

(63) Continuation of application No. 14/514,375, filed on Oct. 14, 2014, now Pat. No. 9,433,230, which is a
(Continued)

(51) Int. Cl.
| | | |
|---|---|---|
| *F25C 1/00* | (2006.01) | |
| *A23G 9/06* | (2006.01) | |
| *B01F 7/00* | (2006.01) | |
| *B01F 15/06* | (2006.01) | |
| *B01F 15/00* | (2006.01) | |

(Continued)

(52) U.S. Cl.
CPC .............. *A23G 9/06* (2013.01); *A23G 9/12* (2013.01); *A23G 9/224* (2013.01); *B01F 7/00408* (2013.01); *B01F 7/241* (2013.01); *B01F 15/00474* (2013.01); *B01F 15/00538* (2013.01); *B01F 15/063* (2013.01); *A23V 2002/00* (2013.01); *B01F 2015/061* (2013.01); *B01F 2215/0021* (2013.01)

(58) Field of Classification Search
CPC ........ F25C 1/00; F25C 5/005; F25C 2600/04; A23G 9/06; A23G 9/12; A23G 9/224; B01F 7/00408; B01F 7/241; B01F 15/063; B01F 2015/061; B01F 2215/0021; B01F 15/00474; B01F 15/00538; A23V 2002/00
See application file for complete search history.

(56) References Cited

U.S. PATENT DOCUMENTS

| | | |
|---|---|---|
| 1,762,081 A | 6/1930 | Schleicher |
| 2,115,742 A | 5/1938 | Newton |

(Continued)

OTHER PUBLICATIONS

The Australian National University, the BOC Liquid Nitrogen Show, Online Article located at www.questacon.edu/au/html/assets/pdf/Liquid_nitrogen.pdf, Commonwealth of Australia 2001, 6 pages.
(Continued)

*Primary Examiner* — Melvin Jones
(74) *Attorney, Agent, or Firm* — Knobbe, Martens, Olson & Bear, LLP

(57) ABSTRACT

Systems and methods of producing a frozen food product include dosing ingredients with a liquefied gas while mixing the ingredients using self-cleaning interlocking beaters. The beaters are optionally also disposed to clean a container in which the ingredients are frozen. The rate and amount of cooling is controlled by measuring the quantity of liquid nitrogen, measuring viscosity of the frozen food product, measuring temperature, and/or the like.

20 Claims, 23 Drawing Sheets

Related U.S. Application Data continuation-in-part of application No. 13/243,978, filed on Sep. 23, 2011, now Pat. No. 8,857,197.

(60) Provisional application No. 61/952,092, filed on Mar. 12, 2014, provisional application No. 61/403,966, filed on Sep. 23, 2010, provisional application No. 61/404,127, filed on Sep. 27, 2010.

(51) Int. Cl.
*B01F 7/24* (2006.01)
*A23G 9/12* (2006.01)
*A23G 9/22* (2006.01)

(56) References Cited

U.S. PATENT DOCUMENTS

| | | | |
|---|---|---|---|
| 2,404,380 A | 7/1946 | Thormod | |
| 2,409,067 A | 10/1946 | Reed | |
| 2,795,235 A | 7/1957 | Hoyt | |
| 3,061,281 A | 10/1962 | Koch | |
| 3,068,105 A | 12/1962 | Morrison | |
| 3,314,660 A * | 4/1967 | Arbiter | A47J 43/044 366/142 |
| 3,412,573 A | 11/1968 | Pauliukonis | |
| 3,503,757 A | 3/1970 | Rubenstein | |
| 3,656,718 A * | 4/1972 | Cairelli | A47J 43/044 366/200 |
| 3,797,514 A | 3/1974 | Byers | |
| 4,089,367 A | 5/1978 | Weitzel | |
| 4,219,581 A | 8/1980 | Dea | |
| 4,403,867 A * | 9/1983 | Duke | B01F 9/12 101/DIG. 34 |
| 4,453,831 A | 6/1984 | Mahon | |
| 4,640,323 A | 2/1987 | Norica | |
| 4,664,529 A | 5/1987 | Cavalli | |
| 4,697,929 A | 10/1987 | Muller | |
| 4,716,822 A | 1/1988 | O'Brien | |
| 4,859,715 A * | 8/1989 | Dubrow | B29C 61/003 210/500.21 |
| 4,919,539 A * | 4/1990 | Drocco | A21C 1/02 366/224 |
| 4,946,287 A | 8/1990 | Barnard | |
| 4,993,238 A | 2/1991 | Inagaki | |
| 5,098,732 A | 3/1992 | Inagaki | |
| 5,472,276 A | 12/1995 | Ratermann | |
| 5,566,732 A | 10/1996 | Nelson | |
| 5,692,392 A | 12/1997 | Swier | |
| 5,758,571 A | 6/1998 | Kateman | |
| 6,233,966 B1 | 5/2001 | Delpuech | |
| 6,510,890 B1 | 1/2003 | Paskach | |
| 6,517,057 B1 | 2/2003 | Aichinger | |
| 6,588,930 B2 * | 7/2003 | Wilson | A47J 43/044 366/199 |
| 6,758,047 B1 | 7/2004 | Giles | |
| 6,796,706 B2 | 9/2004 | Wilson | |
| 6,925,816 B2 | 8/2005 | Anderson | |
| 7,455,868 B2 | 11/2008 | Kennedy | |
| 7,754,266 B2 | 7/2010 | Waletzko | |
| 7,938,061 B2 | 5/2011 | Timmons | |
| 8,679,566 B1 | 3/2014 | Hancock | |
| 8,778,436 B2 | 7/2014 | Waletzko | |
| 8,857,197 B1 | 10/2014 | Fisher | |
| 2003/0024401 A1 | 2/2003 | Zetterlund | |
| 2003/0035877 A1 | 2/2003 | Best | |
| 2003/0098314 A1 | 5/2003 | Phelps | |
| 2004/0107844 A1 | 6/2004 | Kennedy | |
| 2004/0251270 A1 | 12/2004 | Davis | |
| 2006/0110515 A1 * | 5/2006 | Waletzko | A23G 9/06 426/565 |
| 2009/0053375 A1 * | 2/2009 | Johnson | A23G 9/04 426/474 |

OTHER PUBLICATIONS

Nicholas Kurti and Herve This-Benckhard, Chemistry and Physics in the Kitchen, Scientific Amerian, Apr. 1994, pp. 66 and 71 (4 pages).

Brian P. Coppola, et al., I Scream, You Scream . . . A New Twist on the Liquid Nitrogen Demonstrations, Journal of Chemical Education, Dec. 1994, vol. 71, No. 12, p. 1080 (2 pages).

David A. Katz, Liquid Nitrogen Ice Cream, http://www.chymist.com/Liquid%20N2%20ice%20cream.pdf.(accessed Apr. 28, 2008).

H. Henry Rieke IV, Cooking with Chemistry, http://www.polsci.wvu.edu/Henry/Icecream/Icecream.html (accessed Apr. 25, 2008).

Peter Barham, The Science of Cooking, ISBN 3-540-67466-7, Springer-Verlag, Berlin, Heidelberg, New York, p. 143 (3 pages).

Liquid Nitrogen Ice Cream, available at http://www.schnozzle.org/~paulh/recipes/icevream.pdf and http://www.ed.sc.edu/ipd/high/icebream-nitrogen.pdf, undated (3 pages).

Anne Marie Helmenstine, PH.D., How to Make Liquid Nitrogen Ice Cream ?, Helpscience Technology, http://helpscience.com/know_chem5.htm (Acessed Apr. 24, 2008) (2 pages).

Student Affiliates, American Chemical SoCiety, Department of Chemistry, University of Maine, located at http://www.chemistry.umeche.maine.edu/Department/ACS.html, dated May 3, 2005 ( Accessed Apr. 24, 2008) (6 pages).

Sam Barras, Liquid Nitrogen Ice Cream!, Copyright 2000-2002 (Accessed Apr. 17, 2008) (2pages).

"Liquid Nitrogen Ice Cream,"available at http://www.everything2.com/index.pl?node_id+466728, dated Mar. 25, 2000 (Accessed Apr. 17, 2008).

Carmen Cerra, Ben and Jerry, meet Tom and Will, Iowa State Daily, Liquid Nitrogen Ice Cream a cool Idea—Science & Tech, Jan. 31, 2002 (8 pages).

DocBug: Liquid-Nitrogen Ice Cream, Liquid-Nitrogen Ice Cream, dated Nov. 26, 2004, available at http://www.dogbug.com/blog/archives/000233.html (Accessed Apr. 17, 2008) (6 pages).

Jefferson Lab , Odds-n-Ends From Jefferson Lab's BEAMS Program, Liquid Nitrogen Ice Cream, available at http://web.archive.org/web/20020601205541/http://education.jlab.org/beamsactivity/other/In2icebream/ 1pg. 2002.

* cited by examiner

DEVICE AND METHOD FOR DOSING CRYOGENIC LIQUID

CROSS-REFERENCE TO RELATED APPLICATIONS

This application is a continuation of co-pending U.S. patent application Ser. No. 14/514,375 entitled "Device and Method for Mixing Viscous Substances," filed Oct. 14, 2014, which claims priority and benefit of U.S. Provisional Patent Application Ser. No. 61/952,092 entitled "Confectionary Manufacturing" and filed Mar. 12, 2014; U.S. patent application Ser. No. 14/514,375 is a continuation-in-part of U.S. patent application Ser. No. 13/243,978 entitled "Device and Method for Mixing Viscous Substances," filed Sep. 23, 2011, now U.S. Pat. No. 8,857,197, which claims priority and benefit of U.S. Provisional Patent Application Ser. No. 61/403,966 filed Sep. 23, 2010 and entitled "Device and Method for Mixing Viscous Substances," and U.S. Provisional Patent Application Ser. No. 61/404,127 filed Sep. 27, 2010 and entitled "Device and Methods for Dosing Cryogenic Liquid." The disclosures of all the above patent applications are hereby incorporated herein by reference.

BACKGROUND

Field of the Invention

The invention is in the field of generating frozen mixtures, and in some embodiments in the field of ice cream manufacture.

Related Art

Ice cream, one of many frozen confections, is a well-known and favorite desert of millions of people. It is commonly prepared by mixing ingredients such as milk, dairy products, sugar, emulsifying agents, stabilizers, colorants and flavoring agents, sometimes in admixture with solid ingredients that are to be dispersed through the final product, agitating the ingredients while they are chilled and then freezing the mixture.

SUMMARY

Various embodiments of the invention include systems and methods of creating ice cream using a liquefied gas to rapidly cool the ingredients. Rapid cooling produces desirable characteristics in ice cream.

An exemplary embodiment includes a system for reproducibly providing doses of liquid nitrogen to ice cream ingredients. The amount of liquid nitrogen provided can be controlled by pre-measuring a quantity of liquid nitrogen, by measuring viscosity of the cooling ingredients, measuring the amount of cooling achieved, or any combination of these approaches.

Various embodiments of the invention include a system comprising a container mount configured to support a container, a first motor configured to rotate the container mount, a container configured to hold ingredients and to temporally attached to the container mount, a liquid nitrogen dosing system configured to provide a controlled amount of liquid nitrogen to the ingredients in the container such that the ingredients freeze, and interlocking beaters configured to mix the ingredients in the container and configured to be self-clearing to each other, the interlocking beaters being disposed to pass within $1/16^{th}$ of an inch of each other without contacting each other, the self-cleaning being sufficient to remove the frozen ingredients from the interlocking beaters.

Various embodiments of the invention include a method of making ice cream, the method comprising: placing ingredients in a container; mixing the ingredients using at least two interlocking beaters disposed such that the interlocking beaters are within $1/8^{th}$ of an inch of each other but do not touch each other; rotating the container in a direction opposite a rotation of a member of the beaters closest to a side of the container; freezing the ingredients during the steps of mixing and rotating by adding a controlled amount of a coolant to the ingredients, the coolant optionally includes a liquefied gas.

Various embodiments of the invention include a system comprising: a container configured to hold ingredients and to rotate; at least two interlocking beaters configured to mix the ingredients in the container and configured to be self-clearing from each other and to clean a side and/or bottom surface of the container; a liquid nitrogen dosing system configured to provide a controlled amount of cooling from a liquid nitrogen source to the ingredients; a temperature sensor configured to measure the controlled amount of cooling; and a controller configured to regulate the delivery of liquid nitrogen from the liquid nitrogen source in response to the measurement of the controlled amount of cooling.

DETAILED DESCRIPTION

Figure 1:
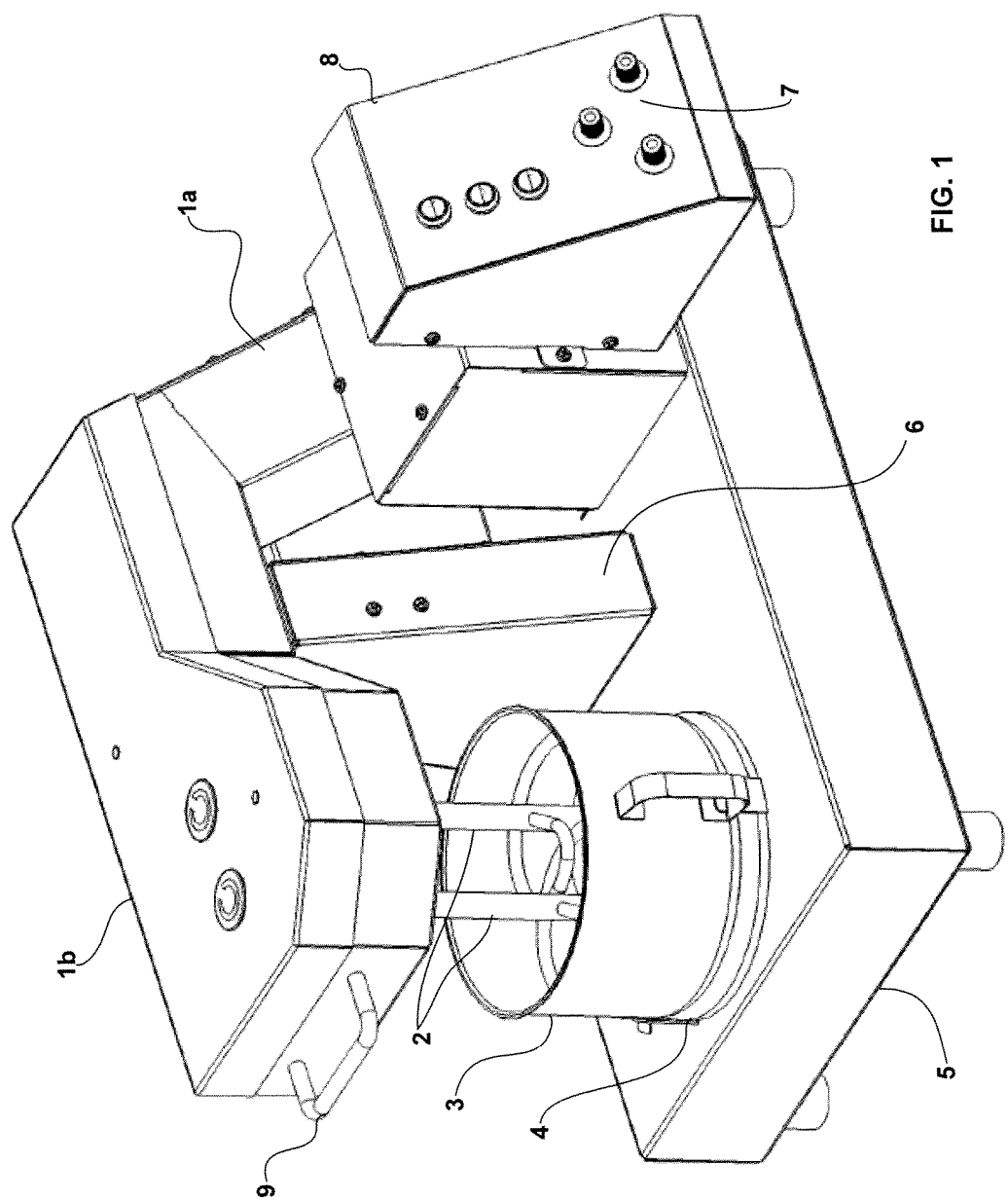
FIG. 1 illustrates a general perspective view of an ice cream production device, according to various embodiments of the invention.

FIG. 1 illustrates a mixer-like body with arm 1a that attaches to mixer head 1b. Extending down from the mixer head are two or more beaters (e.g., agitators or mixing arms) 2. Beneath the beaters is a container 3. The container clips or locks into place atop a container mount 4. The container mount is optionally heated and sits atop body 5. The mixer head may or may not have supporting structure 6. The device may be controlled by on/off switch or lever, or by a more detailed control panel 7. The wiring and components for the device may or may not have protected casings 8. The mixer arm 1a is designed such that the container can be removed and inserted under the beaters 2. In this embodiment, the mixer arm can move from the production position (shown) to an upright position, wherein the head 20 tilts up and back. Additionally, the mixer head may or may not have handle 9, which can be used to move the mixer head to and from the production position. In alternative embodiments the mixer up may move up or to the side to clear the container 3.

Figure 2:
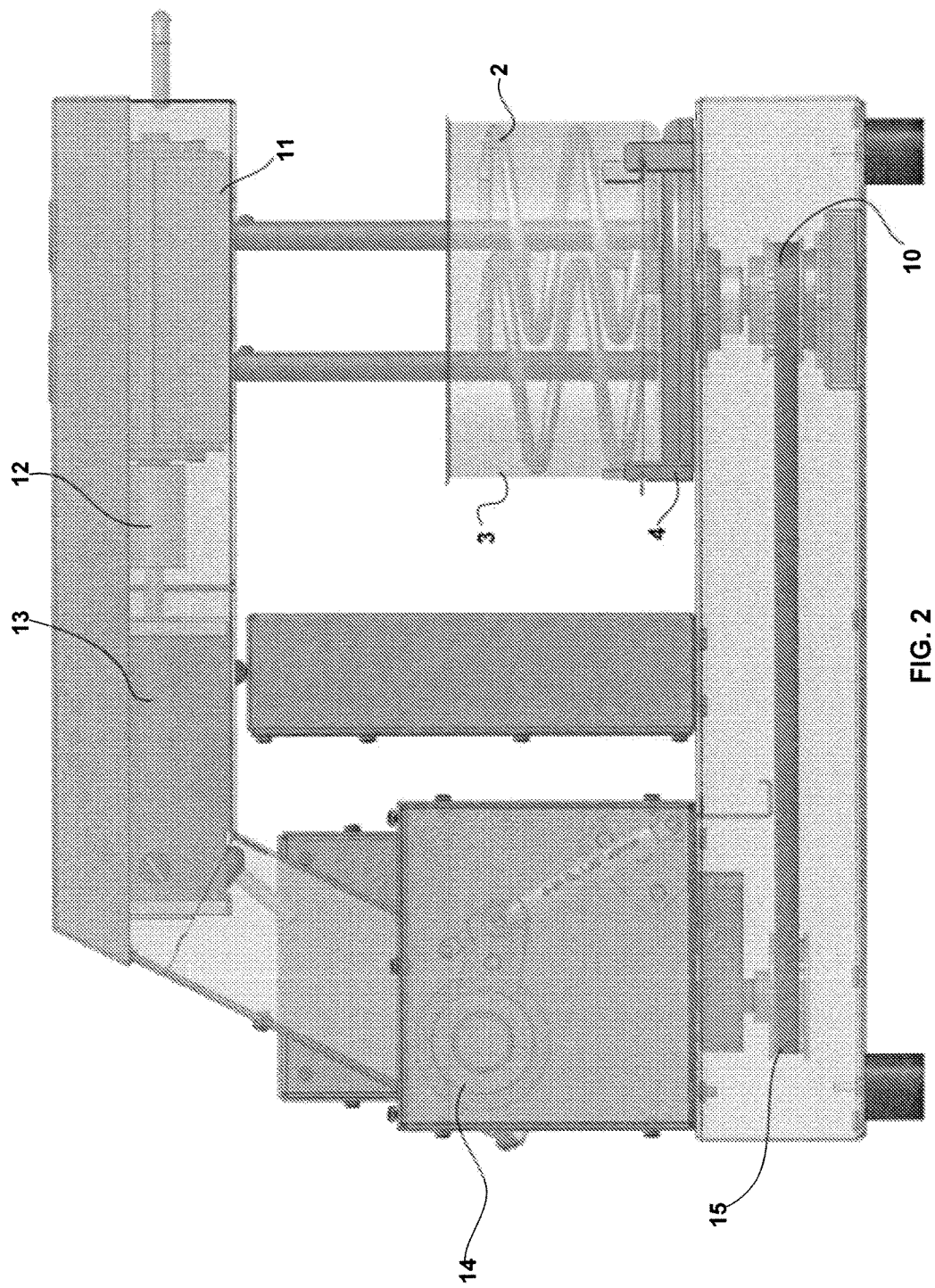
FIG. 2 illustrates the interior components of the system illustrated in FIG. 1, according to various embodiment of the invention.

FIG. 2 shows container mount 4 connected to a belt drive 10 and powered with a mount motor (or combination of transmission and motor) 15. Container 3 is optionally connected to container mount 4 by a spindle (not shown). The spindle can be concentric or non-concentric with container 3. Beaters 2 are driven by transmission 11, which is connected to motor 13 (also visible is shaft coupler 12). In this embodiment, mixer arm 1a is raised using e.g. gas spring 14.

Figure 3A:
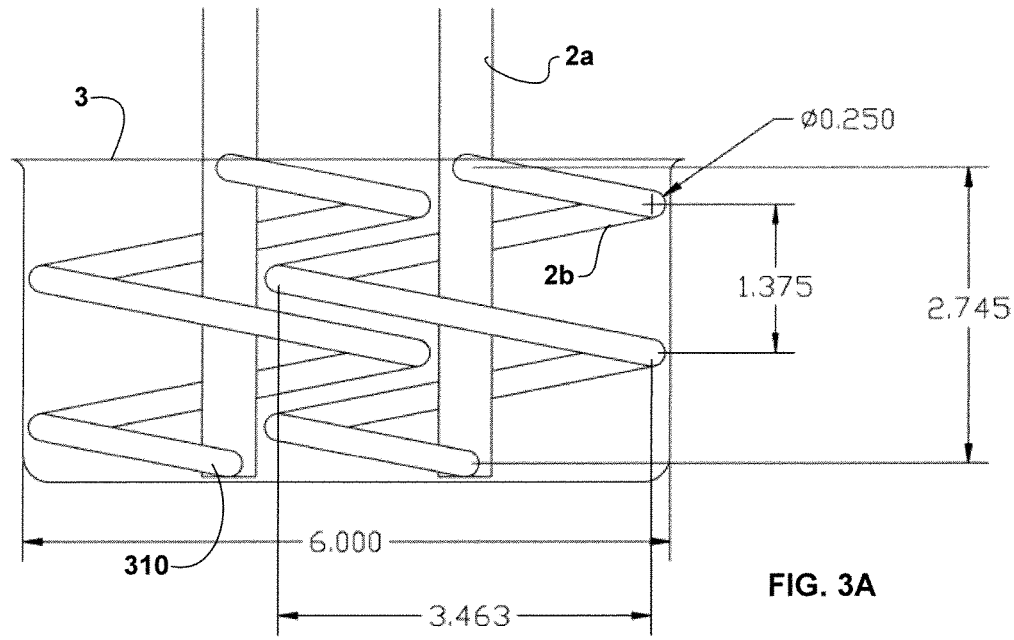
FIGS. 3A and 3B illustrate the interconnectivity of the beater and container design, according to various embodiments of the invention.
Figure 3B:
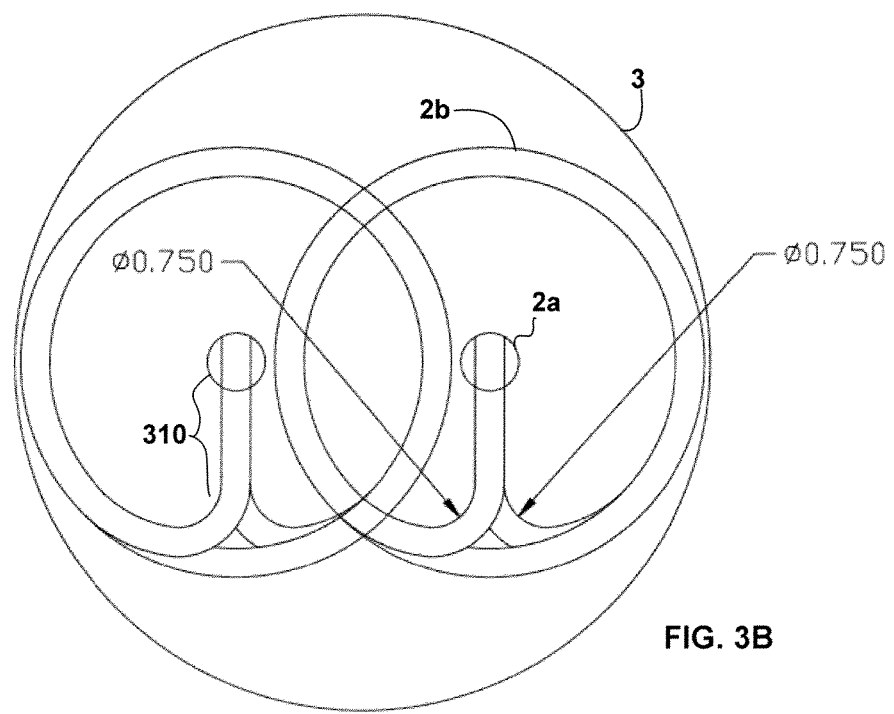

FIGS. 3A and 3B show one embodiment of the interconnectivity of the beaters 2 and container design. Each beater 2 has a shaft 2a and a helical spiral 2b. The beaters 2 are matched such that, when they are paired together and inserted into the mixer head 1b, the spirals fit 2b inside each other without touching the other spiral 2b or the other beater 2a shaft but within very close proximity of both. Specifically, the diameter of the spiral 2b and center shaft 2a as well as the wire diameter (i.e., thickness of the spiral) is such that the outer edge of one beater's spiral almost comes into contact with the shaft of the other beater. In various embodiments this distance can be less than $\frac{1}{4}$, $\frac{3}{16}^{th}$, $\frac{1}{8}^{th}$ or $\frac{1}{16}^{th}$ inches. In addition, the pitch, diameter, spacing and wire diameter is such that, at the center intersection of the installed beaters 2, the high side of one spiral is directly under the low side of the other. Because the helical spirals 2b of the beaters 2 overlap and part of one of the helical spirals 2b is always close to part of the other of the helical spirals 2b as they turn, the beaters 2 are considered to be "interlocked." As used herein, the term "interlocked beaters" is defined to include these features. Furthermore, the high side of one spiral 2b is almost in contact with the low side of the other at the front proximity point and the low side of that same spiral is almost in contact with the high side of the other at the rear proximity point (no actual contact but can be less than $\frac{1}{16}^{th}$, $\frac{1}{8}^{th}$ or $\frac{3}{16}^{th}$ inch apart in various embodiments). Representative measurements are shown in FIGS. 3A and 3B. These measurements are for illustrative purposes only and are not meant to be limiting. This design is scalable vertically and scalable in size. There are many possible cross-sectional designs for the spirals, including, elliptical, rectangular, circular, etc.

In this embodiment of the beater and container design, the beaters 2, when installed into the mixer head, are sized to closely fit the interior walls of the container 3, such that the outer edge of each spiral is in very close proximity with the interior wall of the container. For example, in various embodiments, separation between helical spirals 2b and the side of container 3 is less than $\frac{1}{16}^{th}$, $\frac{1}{8}^{th}$ or $\frac{3}{16}^{th}$ inch. While this close fitting container 3 was found to be the advantageous, a larger container 3 would also be possible, as long as the diameter of the collective beaters 2 is longer than the radius of the container (See, for example, FIGS. 8A-C). Additionally, an off-center container mount 4 could be used. Regardless, the taper of the helical spirals 2b should match that of the container 3—for example, if the helices do not taper, as shown in this variation, then the container 3 is straight-sided and flat-bottomed, such that the bottom of the helical spirals 2b are able to be within very close proximity to the interior bottom of the container 3.

A region 310 of helical spirals 2b is optionally parallel to a bottom of container 3 and is optionally straight. Region 310 is at the part of helical spirals 2b closest to the bottom. In various embodiments all or most of Region 310 is less than $\frac{1}{16}^{th}$, $\frac{1}{8}^{th}$ or $\frac{3}{16}^{th}$ inch from the bottom of container 3. As such, in some embodiments, essentially all of the bottom is cleaned by the relative motion of container 3 and beaters 2.

Figure 4:
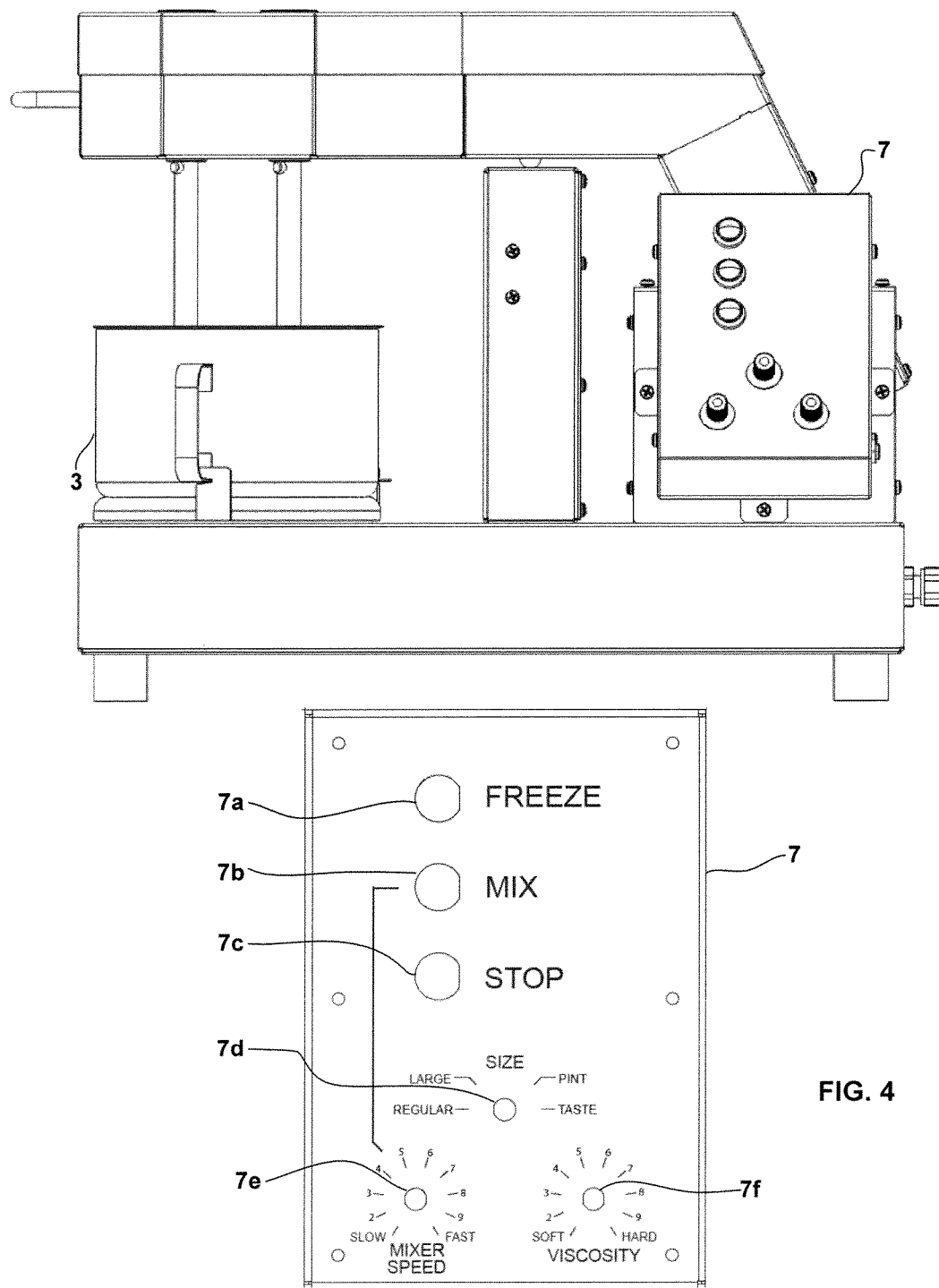
FIG. 4 illustrates a control panel, according to various embodiments of the invention.

FIG. 4 shows an exemplary embodiment of a detailed control panel 7 when this embodiment is used for preparing a frozen product using liquid nitrogen—one of many potential applications of this invention. In this example, there is a freeze button 7a (which could be removed if the embodiment was not used for frozen applications), a mix button 7b, and a stop button 7c. This example also includes a size knob 7d, which can be used to select various serving sizes (regular, large, pint, taste). This variation also includes a mixer Speed knob 7e, which ranges from slow to fast. This example also includes a viscosity knob 7f, which ranges from soft to hard. The viscosity knob 7f is configured to control the viscosity of the final product, which may be determined by measuring actual viscosity or some other parameter as discussed elsewhere herein. The interior of this variation of control panel could include a printed circuit board with wiring connections. Mixer Speed knob 7e can be configured to control the speed of beaters 2 and/or container mount 4. In addition to viscosity selection, control inputs may be configured for a user to select between various recipes as some ingredient combinations and/or products require greater or lesser cooling than others. The different recipes may include different ingredient ratios and/or different total quantities of ingredients. For example, an input may be configured for selection between small, medium and large quantities (sizes) of product.

Figure 5:
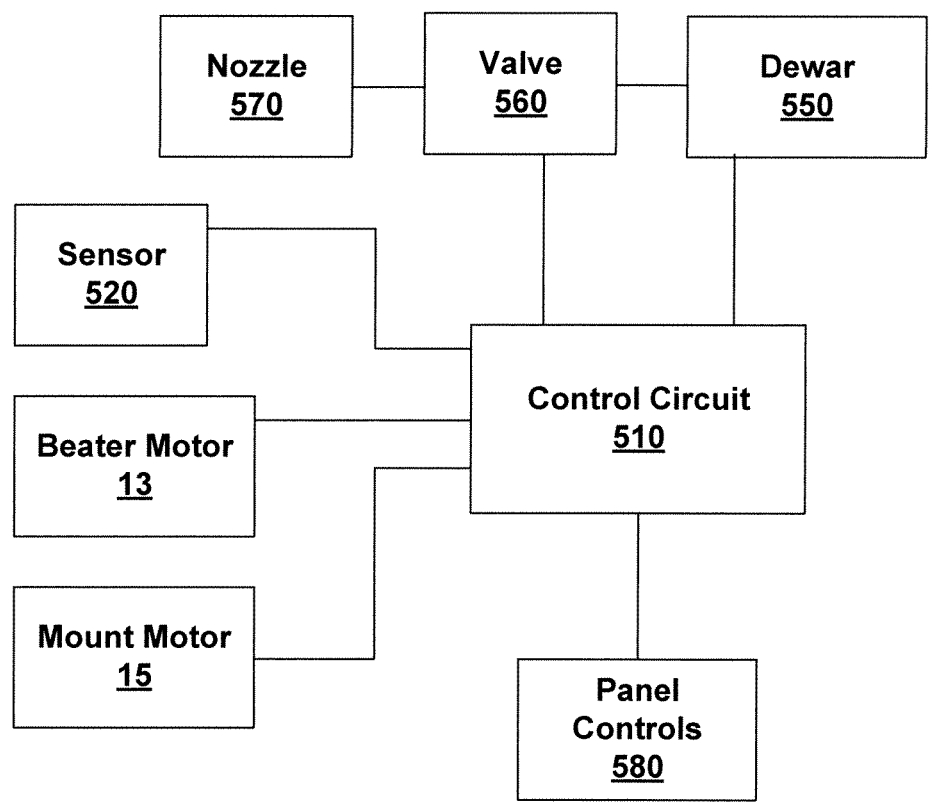
FIG. 5 illustrates a block diagram of the control panel illustrated in FIG. 4, according to various embodiments of the invention.

FIG. 5 shows an example of a block diagram of a control circuit 510 and other components of the system associated with the control panel 7 shown in FIG. 4. Wiring from control circuit 510 connects to various components of the device, including to the panel controls 580, mount motor 15 and beater motor 13. For example, Control Circuit 510 may be connected to one or more valves 560 configured to control the flow of liquid nitrogen from a Dewar 550 to a Nozzle 570. Nozzle is typically disposed adjacent to container 3 such that the liquid nitrogen that flows from the nozzle reaches the ice cream ingredients. Valve 560 is optionally replaced by a scoop or other device configured for sampling a controlled amount of liquid nitrogen. Control Circuit 510 is optionally connected to a level sensor within Dewar 550. Beater Motor 13 is configured to rotate beaters 2. Mount motor 15 is configured to rotate container mount 4.

Sensor 520 is configured to detect properties of the frozen ingredients during the freezing process. In some embodiments, sensor 520 is configured to detect a viscosity of the ingredients. For example, sensor 520 may be configured to detect a load on beater motor 13 or mount motor 15. In this case sensor 520 can include strain, current or voltage sensor configured to detect the torque or power needed to drive the motor 13 or mount motor 15. In some embodiments, sensor 520 includes a temperature measurement device, such as a thermocouple. The thermocouple can be connected to beaters 2, container 3, and/or nozzle 570. In various embodiments the thermocouple is disposed in the stream of liquid nitrogen as it leaves nozzle 570, to measure the temperature of the output pipe 1125, and/or to measure the temperature of the ingredients as they are being mixed and cooled. In addition to the thermocouple, sensor 520 can include a metallic or non-metallic probe (e.g., a copper plate) whose temperature is changed by the liquid nitrogen and is measured by the thermocouple. Some embodiments include more than one sensor 520. The output of sensor 520 is optionally processed using circuits and/or computing instructions executed within control circuit 510, to perform various functions described herein.

One or more viscous substances is/are placed in container 3. For example, if the method is being used to make a frozen dessert, such ingredients may include unfrozen ice cream or custard mix, or pureed fruit for sorbet, or yogurt, or milk or cream, or a non-dairy substitute for milk or cream. Additional ingredients/accompaniments/toppings (e.g., in the case of a frozen dessert: cookies, fresh fruit, or nuts) may also be added to the container prior to or during the process of mixing (and, in this case, freezing). Substance/ingredients may either be placed into the container before or after the container is placed on the container mount.

When the Mix button 7b on control panel 7b is pressed, beater transmission 11, driven by its accompanying motor 13, rotates the beaters, with each beater rotating in the same direction and speed of rotation as the other beater. In some embodiments, the spirals of the beaters move in a downward direction such that the spiral helices 2b are pushing the substance/ingredients downward into the container. At the same time, belt drive 10 powered by its accompanying gear-motor 15 rotates the container 3 at an asynchronous speed relative to the beaters. In some embodiments, the container 3 rotates (typically but not necessarily in the opposite direction as the collective beaters 2 and turns at such a speed with non-small integer ratios such that essentially all of the container's side is scraped by the beaters (again, the beaters 2 not quite touching the side of container 3. In other embodiments the container 3 does is fixed and does not rotate. In these embodiments motor 15 and the associated drive system elements are optional. To demonstrate the rotating container embodiment, in FIG. 3A, spiral helices 2b move counter-clockwise, while container 3 moves clockwise. Due to the beaters' helical shape and movement, in practice, the beaters 2 act to scrape the ingredients from each other's surface and to propel the ingredients down into the container. The ability to remove frozen ingredients from each other makes the beaters 2 jointly self-cleaning. Additionally, because the beaters 2 are designed to fit the container 3 and the container 3 is rotating at an asynchronous speed relative to the collection of beaters 2, the beaters 2 also act to scrape the ingredients off of the sides of the container 3. Due to the asynchronous movement between the collective beaters 2 and the container 3, the collective beaters 2 are, in essence, orbiting together around the interior surface of the container 3, such that most interior sides of the container are scraped by the collective beaters 2. If pitch, diameter, spacing and wiring gauge are all correct, most of the surfaces are close to a scraping action.

The underlying purpose of this beater-container design is to ensure that the substance in the container is evenly mixed (and, in the case of making a frozen product, frozen) throughout and that all ingredients are incorporated into the mixing (and, in the case of making a frozen product, freezing) process. Additionally, the collective helical beater design minimizes crushing of additive by allowing their escape from between moving parts, using a wiping rather than a crushing motion at intersections. This beater-container design is especially effective for making frozen product using liquid nitrogen as the freezing agent because the formation of small ice crystals has a significant impact on the texture of the frozen product (e.g., ice cream). Some embodiments of the invention ensure the creation of an exceptionally high quality frozen novelty product—the formation of exceptionally small ice crystals—because of the even distribution of the ingredients, the constant scraping of ingredients off surfaces, and the downward motion of the spirals. Note that in some embodiments the container 3 is moved while the beater(s) 2 is(are) stationary.

The control circuit 510 can be programmed to run the motors for a number of seconds every time the mix button is pressed and then to stop running the motors after that time is up. Alternatively, the control circuit 510 can be programmed to run the motors continuously, in which case Stop button 7c can be pressed to halt the motors. There may or may not be a mixer speed knob 7e, which moves the beaters 2 and/or the container 3 faster and slower depending on its position. Additionally, if desired, the control circuit 510 can be programmed to read Size knob 7d (such that the device mixes for a longer time depending on the amount of ingredients placed in the container); Viscosity knob 7f (such that the device mixes until the desired viscosity has been reached), and/or a recipe knob (not shown) to select between different recipes. The knob inputs illustrated in may be replaced by digital inputs such as a computer touchscreen interface, membrane switches, a graphical user interface, and/or the like.

Embodiments may or may not have viscosity measurement capabilities, i.e. the viscosity knob 7f on the control panel 7. When this capability is included, the entire device can be integrated and the entire mixing (and, in the case of making a frozen product, freezing) process can be completely automated, without requiring the watchful eye of a machine operator. For example, in some embodiments, control circuit 510 is programmed to read the torque of either the beater motor or the container motor and control the dosing of coolant depending on the measured torque and the viscosity knob 7f setting. Generally, the beater torque has a lot of noise in it, so in one approach is to use the measurement of the container motor torque and to use a small motor, which can give a good indicator of how viscous the substance is. Because the collective beaters optionally have asynchronous movement relative to the container, the motors driving the container and beaters are, in essence, working against each other to some degree. For instance, in the aforementioned example, the container is moving in the opposite direction as the collective beaters such that the collective beaters are working "against" the container. As such, when the substance or ingredients is/are thickening, the motors have to work harder and harder. By setting the desired viscosity, the operator is indicating how hard the motor should work before stopping and, in essence, before the substance/product is done and ready for removal from the container (or ready for the next step in its mixing process). The control circuit 510 can be programmed to take into account momentary increases in torque as a result of the beaters working through chunks (e.g., in the case of making a frozen dessert, these chunks may be nuts or chocolate chips). For instance, logic on control circuit 510 can be set to shut down the system (and stop coolant introduction) when the system exceeds a certain torque for a number of seconds in a row. As such, momentary increases in torque are ignored. This logic can include hardware, firmware and/or software stored on a computer readable medium.

In the case of making a frozen product using liquid nitrogen, liquid nitrogen can either be added manually or through a dosing system, which would typically be connected to a liquid nitrogen supply—an example of this supply is shown as Dewar 550 in FIG. 5. If the liquid nitrogen is added manually, then the freeze button 7a on control panel 7 acts the same as mix button 7b. In this case, there need only be one button or lever, in essence Mix/Freeze, which activates the device. Note that the mix button 7b is optional. Mixing can occur manually outside of the container 3.

Figure 6:
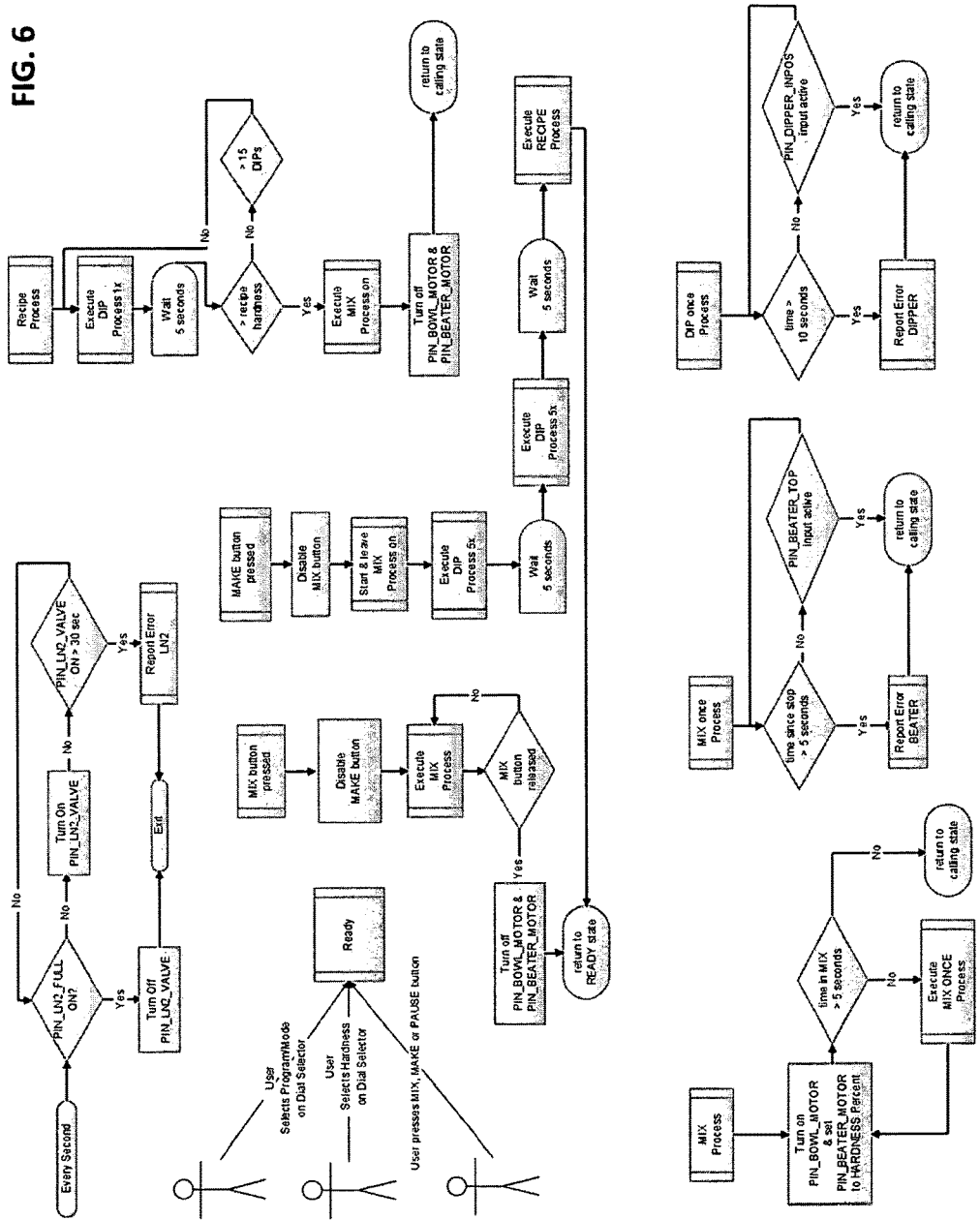
FIG. 6 illustrates a flow chart of an example algorithm for dispensing of liquid nitrogen, according to various embodiments of the invention.

If the device is hooked up directly to a liquid nitrogen supply and accompanying dosing system, then the freeze button 7a in FIG. 4 optionally has additional functionality. For example, the freeze button 7a may cause control circuit 510 to start and stop the dispensing of the liquid nitrogen into the container 3. In essence, the control circuit 510 can have a connection point to the dosing system such that the freeze button 7a activates some sort of valve (e.g., valve 560, depending on the selected dosing system), such as a needle valve or a solenoid valve, which releases liquid nitrogen into the container 3. The control circuit 510 may also have a connection point for a level sensor, which would ensure that the liquid nitrogen supply is sufficient. The dosing system may also have a phase separator such that a known quantity of liquid can be added. The software associated with the Freeze button can be programmed to have different liquid nitrogen dispensing algorithms for different sizes or variations of frozen novelty products. An example algorithm is shown in FIG. 6. In this variation, Size knob 7d can be used to select which liquid nitrogen dispensing algorithm is used. For instance, a large size requires more liquid nitrogen dispensed than a regular size. The algorithms may be based on a combination of the following factors: quantity of liquid nitrogen, time, output of sensor 520 (a viscosity or temperature measurement), and torque/load of the motor(s). The liquid nitrogen, when added manually or through the integrated dosing system, can be added in one bulk pouring or in multiple releases over a period of time. Typical dispensing times are under two minutes for a 4-10 ounce batch size.

FIG. 6 illustrates several methods that may be performed using control circuit 510. These include a) determining at regular intervals if more or less liquid nitrogen should be added and turning on or off valve 560 accordingly; b) monitoring an amount of cooling that has been provided to the ingredients and turning on or off valve 560 accordingly; c) detecting which of panel controls 580 have been activated; starting and stopping motors 13 and/or 15; and monitoring viscosity of the frozen ingredients and turning on or off valve 560 accordingly.

Figure 7:
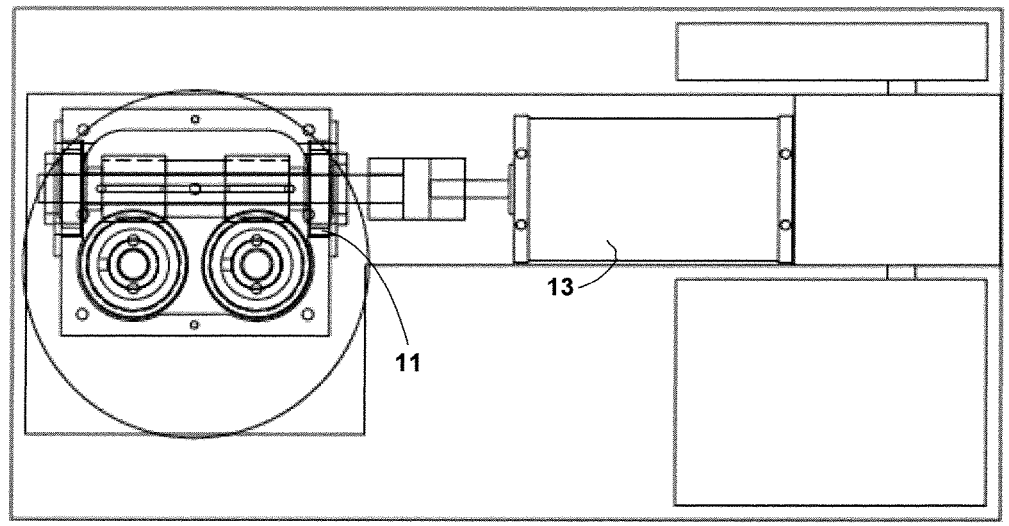
FIG. 7 illustrates the beater drive system, according to various embodiments of the invention.
Figure 7:
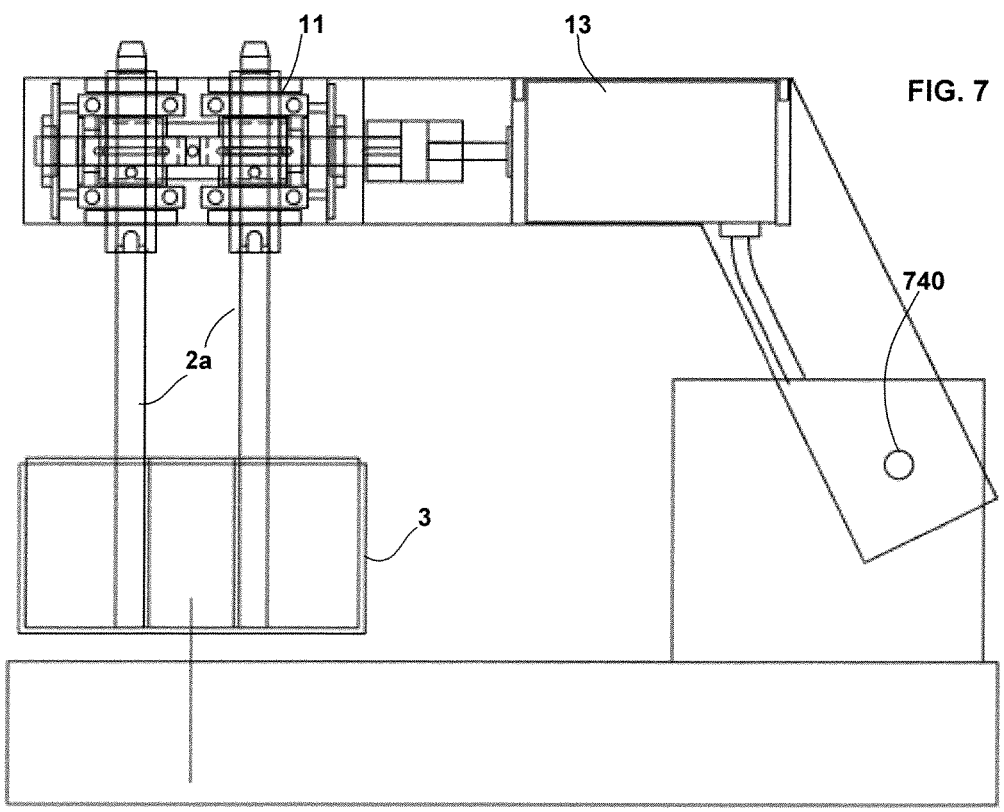

FIG. 7 shows the beater drive system, according to various embodiments of the invention. The beater drive system includes a beater motor 13, mechanically coupled to transmission 11 and drive shafts 2a configured to turn the beaters 2. The beater motor 13 optionally includes sensor 520 configured to measure motor speed or current drawn by one or more of the motors 13 or 15. The beater drive system typically includes a hinge 740 configured such that the beaters 2 can be lifted from the container 3. Hinge 740 is optionally motorized and controlled by control circuit 510. In alternative embodiments, the same motor is configured to rotate any combination of beaters 2, hinge 740, and/or container 3. The beater drive system is optionally configured to rotate beaters in the same direction, and optionally configured to rotate at least one of beaters 2 in a direction opposite the rotation of container 3. Beater motor 13 is optionally disposed in alternative positions.

Figure 8A:
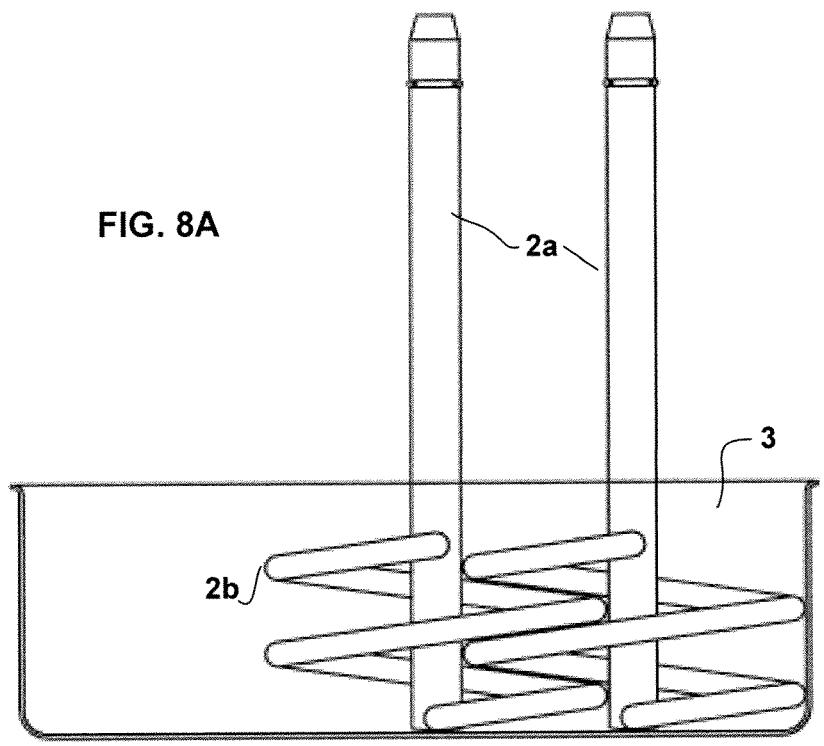
FIGS. 8A-C illustrates helical beaters in a container, according to various embodiments of the invention.
Figure 8B:
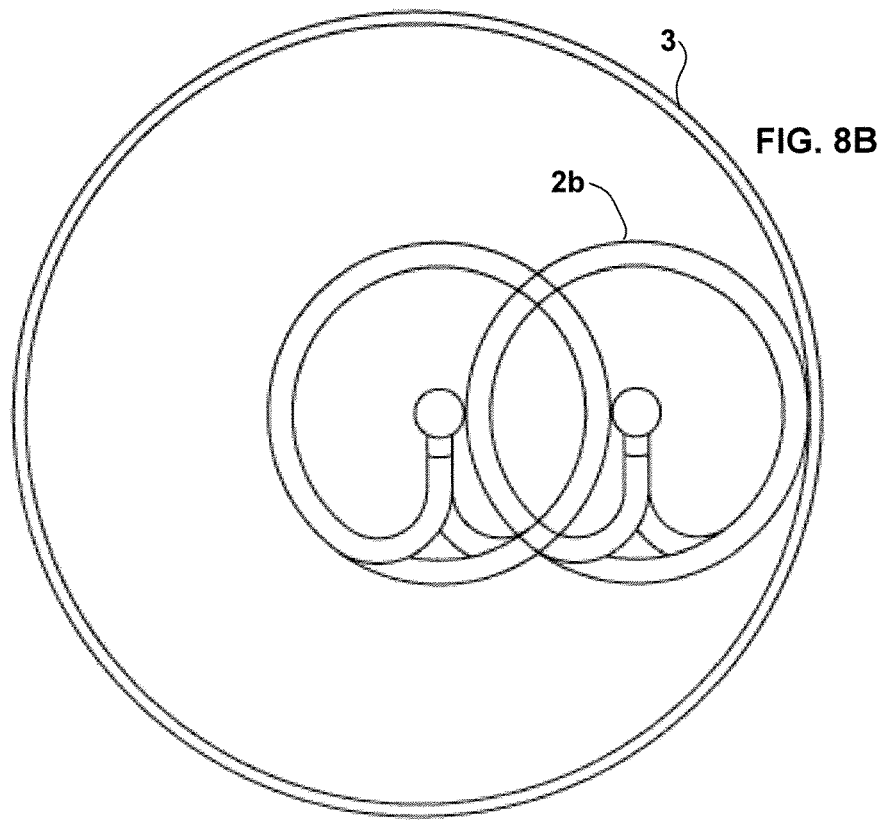

FIGS. 8A and 8B show examples of helical beaters 2 in a container 3, according to various embodiments of the invention, in these examples the helical beaters 2 are disposed such that one of the beaters 2 is closer to a side surface 810 of the container 3 relative to a second of the beaters 2. In various embodiments the distance between the closer beater 2 and side surface 810 is less than $\frac{1}{4}$, $\frac{3}{16}^{th}$, $\frac{1}{8}^{th}$, or $\frac{1}{16}^{th}$. However, in typically embodiments the closer beater is disposed such that it does not touch side surface 810. Similar positioning between side surface 810 and beaters may be found in embodiments wherein beaters 2 are symmetrically disposed within container 3. Either of these positions allows beaters 2 to clean frozen product from side surface 810. If the beaters 2 rotate in opposite directions, then that beater closest to side surface 810 is rotated in a direction counter to side surface 810. Otherwise, the rotations are such that at least one of beaters 2 is disposed next to side surface 810 and rotates in a direction opposite to the direction side surface 810 is rotated.

Figure 8C:
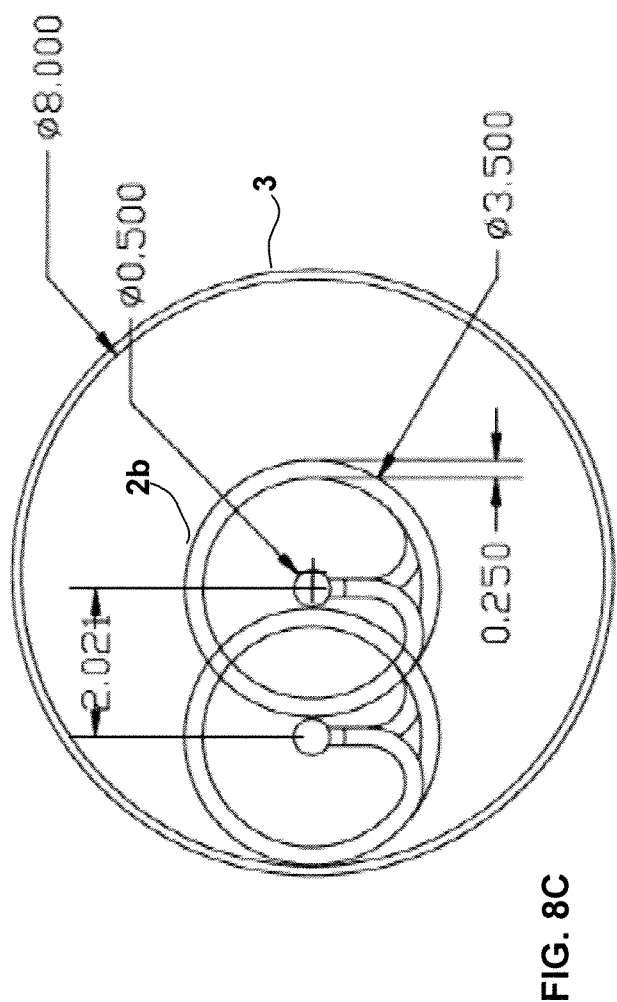

FIG. 8C illustrates one example of a top view of beaters 2 and container 3. The distances are shown in inches and degrees, and are meant to be non-limiting examples.

Figure 9:
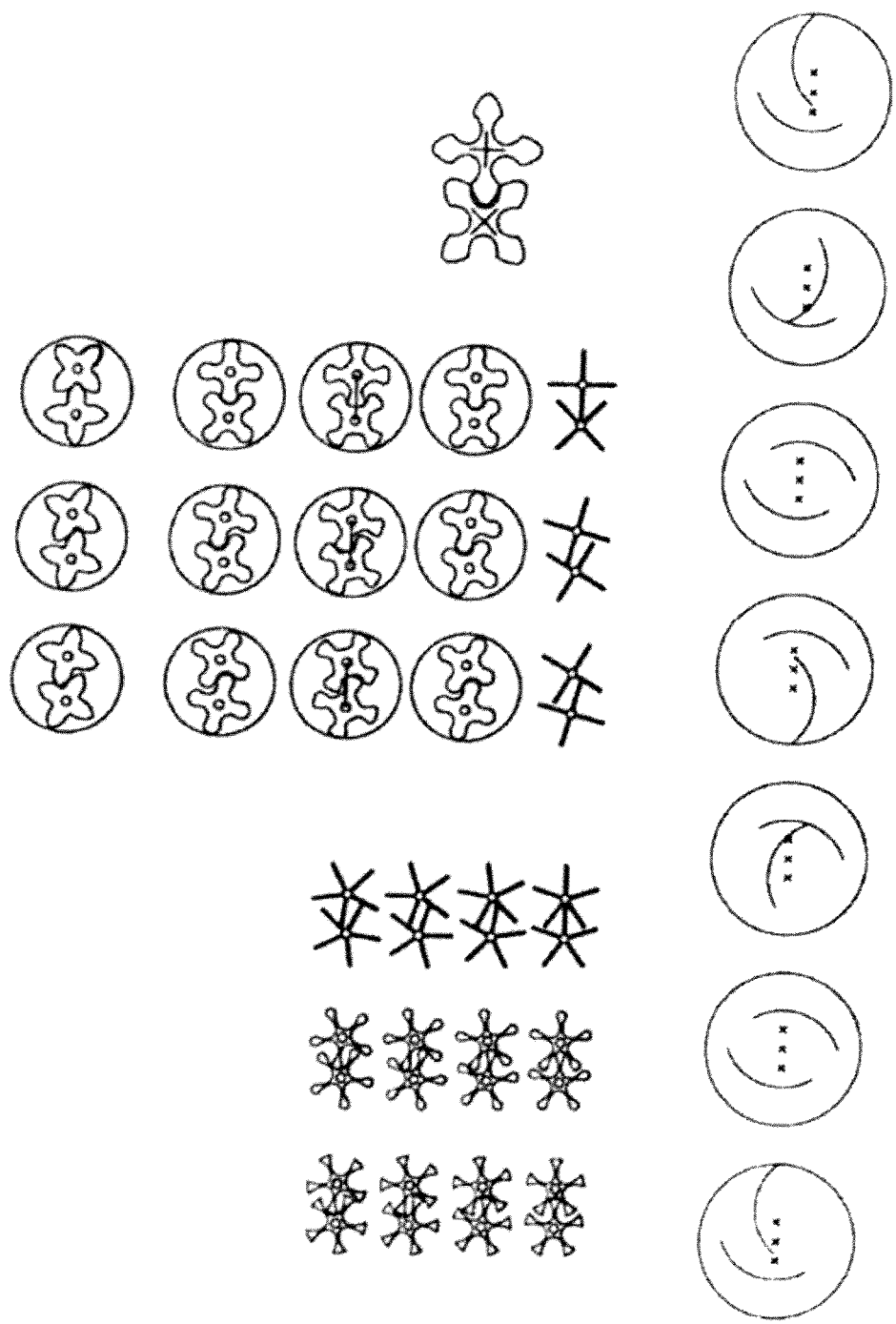
FIG. 9 illustrates alternative beater/agitator designs, according to various embodiments of the invention.

FIG. 9 illustrates various alternative beater 2/agitator designs, according to various embodiments of the invention. One feature common to most of these designs is that they are self-cleaning. In each example the beaters 2 rotate so as to remove frozen product from each other and/or from surfaces of the container 3.

Figure 10:
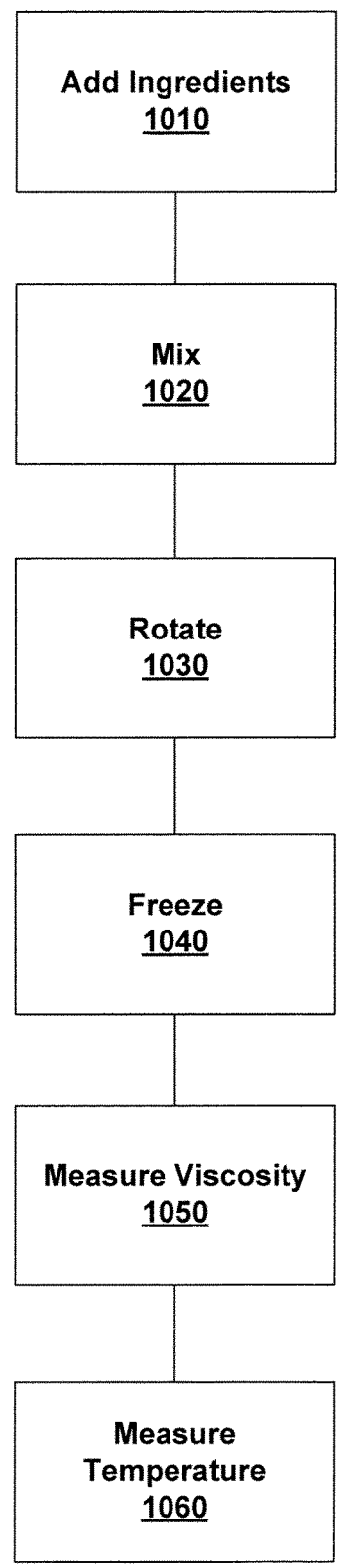
FIG. 10 illustrates a method of making frozen ice cream, according to various embodiments of the invention.

FIG. 10 illustrates a method of making frozen ice cream, according to various embodiments of the invention. In an add ingredients step 1010 ice cream ingredients are added to container 3. As described herein the ingredients can include a wide variety of food stuffs including cream, yogurt, sugar, flavoring, and the like. The addition is optionally automated.

In a mix step 1020 the ingredients are mixed using two or more interlocking beaters 2. In various embodiments, the beaters 2 are disposed to within less than $\frac{1}{4}$, $\frac{3}{16}^{th}$, $\frac{1}{8}^{th}$, or $\frac{1}{16}^{th}$ inches of each other. Typically the beaters 2 do not touch each other. At these distances the beaters operate to be self-cleaning, e.g., they clean frozen (ice cream) product from each other. Mixing occurs by rotating the interlocking beaters 2.

In an optional rotate step 1030, the container 3 is rotated. Typically this rotation occurs in a direction that is opposite the rotational direction of a member of the beaters 2 that is in close proximity to a side of the container. For example, the member of the beaters 2 that is closest to a side surface of the container. The container 3 can be rotated using the same or a different motor than is used to rotate the beaters 2.

In a freezing step 1040, a coolant is added to the ingredients in the container 3. The coolant is typically a liquefied gas such as liquid nitrogen, and is delivered in a control manner. For example, in some embodiment a controlled amount (volume or mass) of coolant is added. In some embodiments, the coolant is added for a specific length of time, until a measured viscosity of the ingredients is achieved, and/or until a desired temperature drop is achieved. Control can be achieved by opening and closing a valve or by collecting a specific amount of fluid from a reservoir.

The freezing step 1040 is optionally performed in parallel with a measure viscosity step 1050. In measure viscosity step 1050 the viscosity of the ingredients is measured using sensor 520 as the coolant is added. As discussed elsewhere herein, viscosity can be measured by monitoring current consumed by the motor 13 or 15, monitoring the speed of motor 13 or 15, and/or the like. If the viscosity is measured, then the delivery of the coolant to the ingredients can be controlled responsive to this measurement.

The freezing step 1040 is optionally performed in parallel with a measure temperature step 1060. In measure temperature step 1060 the temperature of the ingredients is measured using and embodiment of sensor 520 as the coolant is added. These embodiments of sensor 520 can include, for example, a thermocouple or an optical sensor. The measured temperature could be that of the ingredients themselves, part of beaters 2, part of container 3, part of a nozzle used to deliver the coolant, or of a metallic (or non-metallic) object placed in the stream of the coolant. If the temperature is measured then the delivery of the coolant to the ingredients can be controlled responsive to this measurement. Optionally, both temperature and viscosity are measured using separate embodiments of sensor 520.

Figure 11:
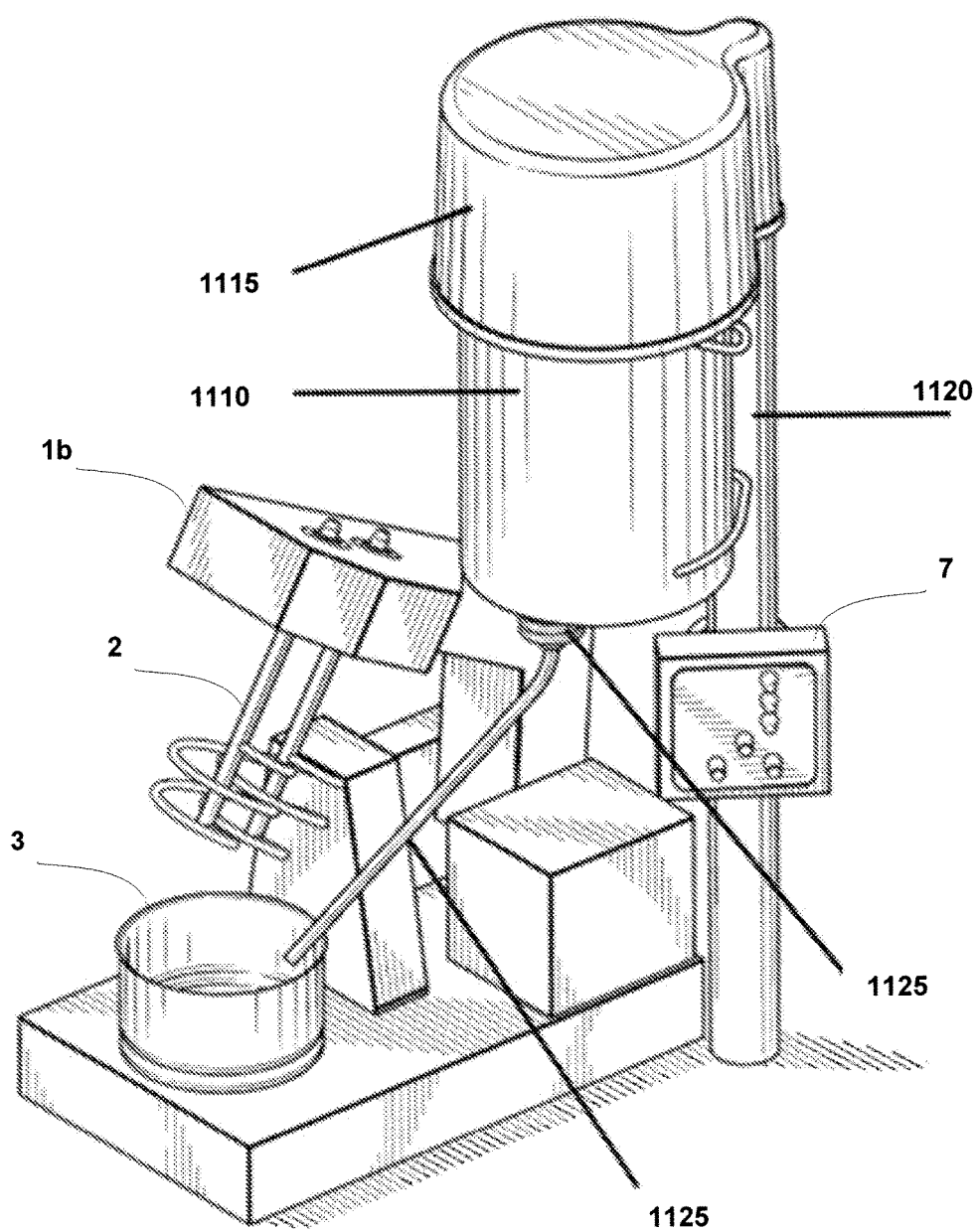
FIG. 11 illustrates the ice cream production system of FIG. 1 further comprising a liquid nitrogen dosing system, according to various embodiments of the invention.

FIG. 11 illustrates the ice cream production system of FIG. 1 further comprising a liquid nitrogen dosing system 1110, according to various embodiments of the invention. The liquid nitrogen dosing system 1110 is optionally controlled via control panel 7 and/or Control Circuit 510, and is configured to provide reproducible doses of liquid nitrogen or another cryogenic liquid to container 3 via an output pipe 1125. The liquid nitrogen dosing system 1110 may be manually filled or may be connected to a pressurized reservoir (not shown) of liquid nitrogen. In order to provide reproducible doses of liquid nitrogen, liquid nitrogen dosing system 1110 is configured to store a volume of liquid nitrogen and to release one or more dose of the liquid nitrogen to container 3 from a bottom of liquid nitrogen dosing system 1110. The dose is reproducible, in part, because by sampling from the bottom the dose includes primarily liquid rather than gas phase nitrogen. Liquid nitrogen dosing system 1110 optionally includes embodiments of Nozzle 570, Valve 560 and Dewar 550. Liquid nitrogen dosing system 1110 optionally includes a cover 1115 and a support structure 1120.

Figure 12:
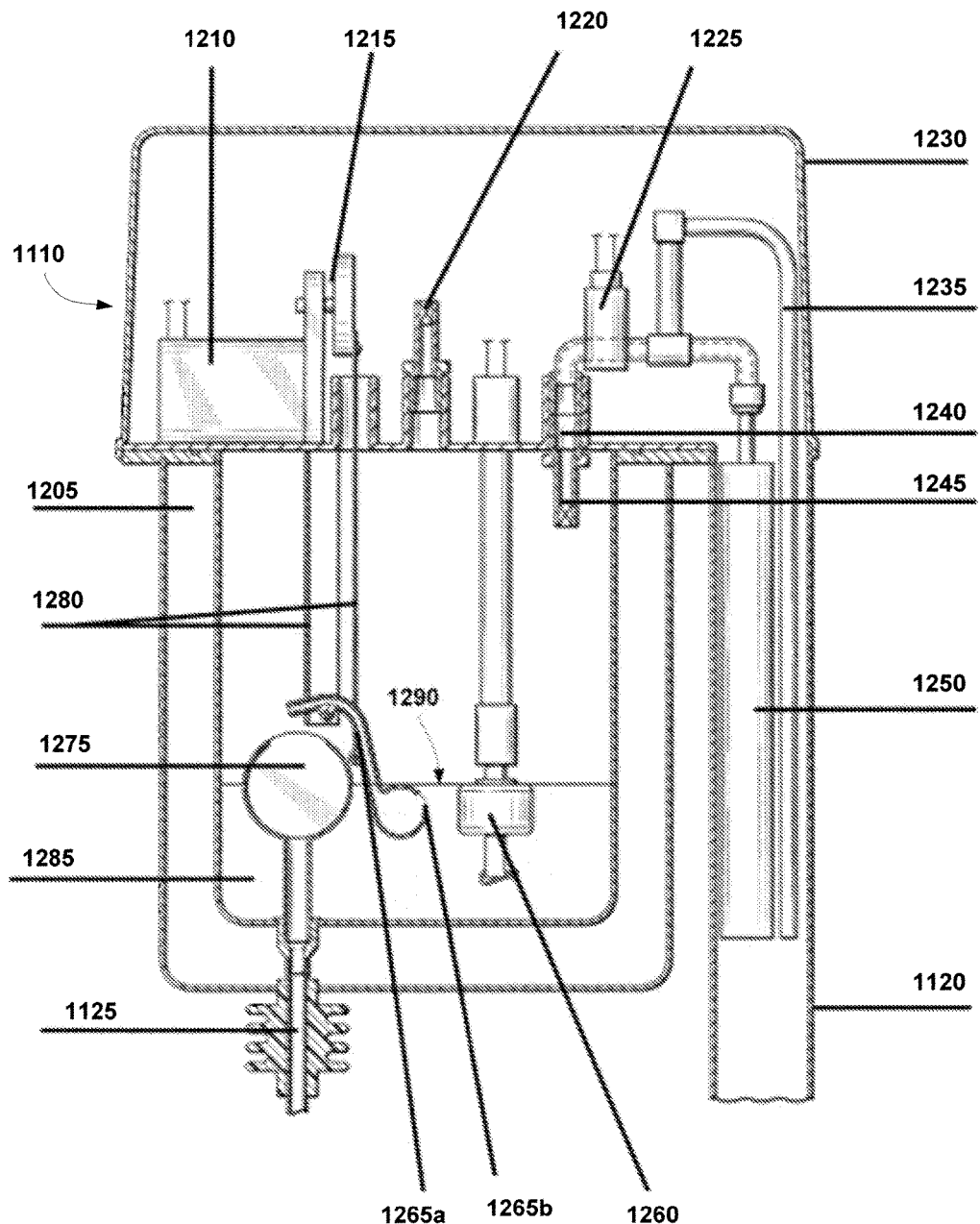
FIG. 12 illustrates a cross-sectional view of a liquid nitrogen dosing system, according to various embodiments of the invention.

FIG. 12 illustrates a cross-sectional view of liquid nitrogen dosing system 1110, according to various embodiments of the invention. The liquid nitrogen dosing system 1110 includes a container with vacuum jacketed walls 1205 and an optional relief vent 1220. An actuator 1210 is connected to a lifting mechanism 1215 (e.g. a cam or lever arm). The actuator 1210 can be manually actuated, or can be connected to a control system (e.g., a button or switch) that is configured to run the lifting mechanism 1215 through one or more cycles of lifting, or can be connected to a more complex control system such as control circuit 510 and/or control panel 7.

Extending from the lifting mechanism 1215 is a wire or other connector 1280 that attaches to a dipper mechanism 1265a. One side of the dipper mechanism 1265a, referred to as the "head" of the dipper mechanism, extends down into a reservoir 1285 of cryogenic liquid. The head of the dipper mechanism has a scoop 1265b of a desired size such that, when the dipper mechanism 1265a is raised by the lifting mechanism 1215, a controlled quantity of cryogenic liquid is transported to a delivery port or funnel 1275. The delivery port or funnel 1275 is attached to the interior of the liquid nitrogen dosing system 1110. The top of the delivery port or funnel 1275 is disposed above a bottom of reservoir 1285 such that it is above a normal operational liquid level 1290 of cryogenic liquid. The delivery port or funnel 1275 is funnel or tube connected to output pipe 1125 such that liquid nitrogen introduced into the funnel 1275 flows by action of gravity to container 3.

Typically, the interior of liquid nitrogen dosing system 1110 is at or near atmospheric pressure. As such, the flow is liquid nitrogen into container 3 is gravity fed and any excess pressure within liquid nitrogen dosing system 1110 does not cause significant variation in the volume of liquid nitrogen provided per dose. Note that when not filled with liquid nitrogen, delivery port or funnel 1275 is typically open to both the atmosphere (adjacent to container 3) and the volume within liquid nitrogen dosing system 1110 that contains gas phase (evaporated) nitrogen. As a result, the evaporation of liquid phase nitrogen within liquid nitrogen dosing system 1110 causes a net flow of cold nitrogen gas out through funnel 1275 and output pipe 1125. This results in precooling and/or purging of output pipe 1125, prior to delivery of liquid doses of nitrogen.

Liquid nitrogen dosing system 1110 may be filled with liquid nitrogen (and the liquid level 1290 approximately maintained) either manually or automatically. In those embodiments that include automatic filling, liquid nitrogen dosing system 1110 includes a sensor 1260 configured to detect the level or quantity of liquid nitrogen in liquid nitrogen dosing system 1110. In some embodiments, the sensor 1260 includes a float level sensor that extends down from the top of liquid nitrogen dosing system 1110.

However, in alternative embodiments, sensor 1265 includes a mass sensor or scale or other mechanism configured to measure a changing quantity of cryogenic liquid within the liquid nitrogen dosing system 1110. Sensor 1265 can be mechanical or electronic. In either case, sensor 1265 is configured to control an actuating valve 1225.

In embodiments including an electronic sensor 1265, sensor 1265 is configured to communicate an electronic signal via wiring, such as Control circuit 510, to actuation valve 1225.

The actuating valve 1225 is typically coupled to a cryogenic liquid delivery pipe 1250 external to the vacuum jacketed walls 1205. Delivery pipe 1250 is configured to transfer liquid nitrogen from an external (liquid nitrogen) supply tank (not shown). The delivery pipe 1250 and the external supply tank are optionally pressurized such that when actuating valve 1225 is open liquid nitrogen flows into liquid nitrogen dosing system 1110. Optionally, a diffuser 1245 is used to minimize the splash of the cryogenic liquid as it enters the reservoir 1285. The diffuser 1245 may be attached at an end 1240 of the delivery pipe 1250 that is inserted into the container. The cryogenic liquid collects in the reservoir 1285.

Control circuit 510 is optionally configured to control actuator 1210 and actuating valve 1225. This control can be in response to a predetermined dosing algorithm, to a batch size, to a desired viscosity, to a temperature measurement, to an identity of the ingredients being mixed, and/or the like.

If a sensing mechanism 1260 is used, then the sensing mechanism 1260 senses the increased quantity of cryogenic liquid within reservoir 1285. The sensing mechanism 1260 can produce a signal that indicates the reservoir 1285 is at capacity and/or that the reservoir 1285 requires more cryogenic liquid in order to provide repeatable doses of cryogenic liquid. A computerized control system (e.g., Control Circuit 510) can be used to take the signal from the sensing mechanism 1260, interpret this signal, and then send a signal to close or shut-off the actuating valve 1225 when the reservoir 1285 reaches the maximum desired quantity of cryogenic liquid. Whenever the sensing mechanism 1260 indicates to the control system that the liquid level 1290 within reservoir 1285 of cryogenic liquid has slipped below its minimum level, the control system opens the actuating valve 1225 to fill the reservoir 1285 again, until the desired quantity of cryogenic liquid is reached. In the case of the embodiment shown in FIG. 12, the desired liquid level 1290 is in the range wherein the liquid level 1290 is beneath the opening of the delivery funnel 1275 but above the level of the scoop in the head of the dipper mechanism 1265b.

The components of liquid nitrogen dosing system 1110 illustrated in FIG. 12 optionally have a protective covering 1115. Similarly, wiring for the actuating valve 1225 and/or wiring for the actuator 1210 that moves the lifting mechanism 1215, and the cryogenic liquid delivery pipe 1250 (if present) may be encased in another pipe/covering 1120 such that the unit is smooth and cleanable from the outside.

To dispense cryogenic liquid from the container, the actuator 1210 (which is actuated manually, or by a simple control switch/lever/system, or by a more complex/computerized control system) activates the lifting mechanism 1215. The lifting mechanism 1215 pulls the wire/connector 1280, which raises the dipper head 1265b. The cryogenic liquid that has collected in the scoop of the dipper head 1265b is then dispensed into the delivery funnel 1275. The scoop/dose of cryogenic liquid then exits the container through the output pipe 1125. This invention is scalable—i.e., the container, the dipper mechanism, the scoop in the dipper head 1265b, the delivery funnel 1275, etc. can be built to whatever size is preferable for the application.

Figure 13A:
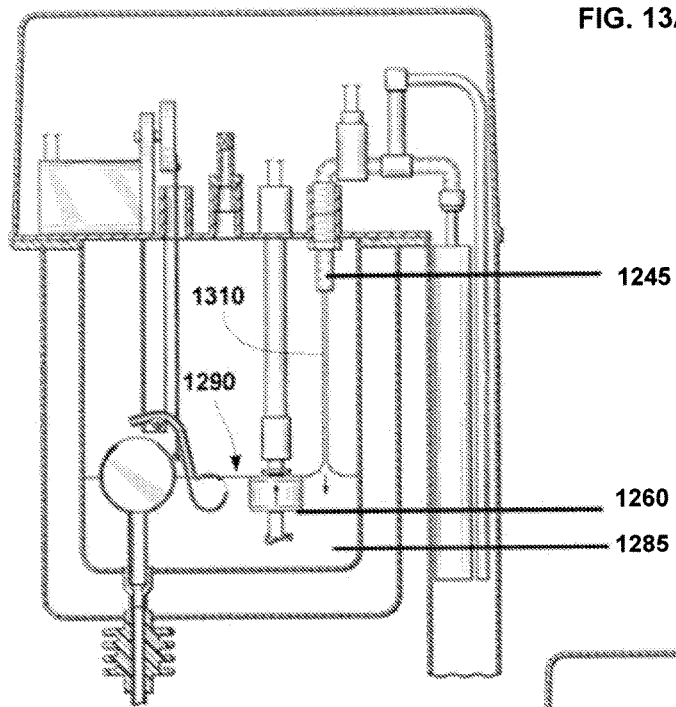
FIGS. 13A and 13B illustrate the embodiments of a liquid nitrogen dosing system illustrated in FIG. 12 at two steps in a dosing process, according to various embodiments of the invention.
Figure 13B:
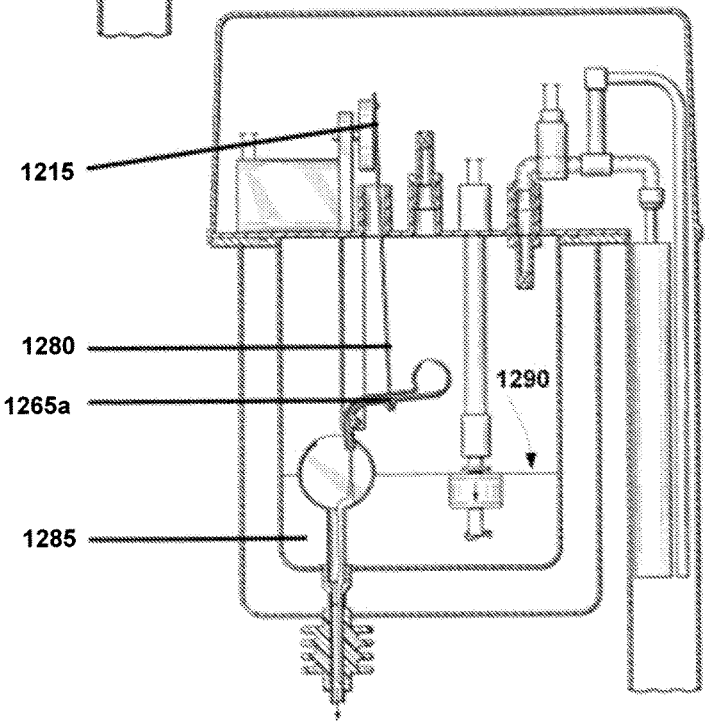

FIGS. 13A and 13B illustrate the embodiments of liquid nitrogen dosing system 1110 illustrated in FIG. 12 at two steps in a dosing process. FIG. 13A shows a stream 1310 of cryogenic liquid (e.g. liquid nitrogen) coming through the diffuser 1245, as controlled by actuating valve 1225. As a result of liquid entering the container, the sensing mechanism 1260, which in this case is a float level sensor, senses that the level of cryogenic liquid in the reservoir 1285 has gone up. FIG. 13B shows the dipper mechanism 1265b being lifted up and above the liquid level 1290 by the wire/connector 1280 being pulled by the lifting mechanism 1215. As a result of the dipper mechanism 1265b transfers a portion of cryogenic liquid from the reservoir to the funnel 1275. The sensing mechanism 1260 senses a resulting drop in the liquid level 1290. If the drop is sufficient, then further cryogenic liquid is added to liquid nitrogen dosing system 1110 as illustrated in FIG. 13A.

Figure 14:
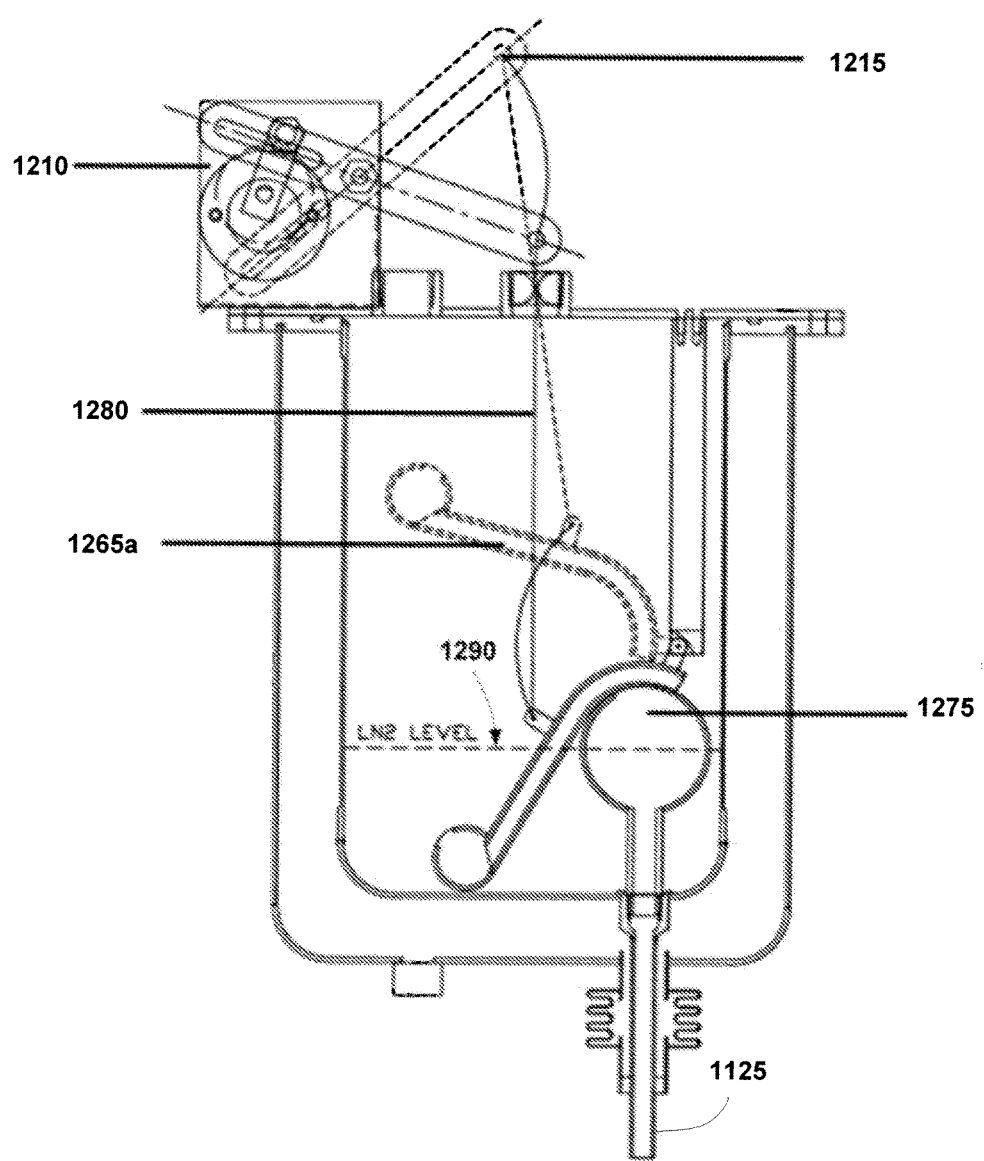
FIG. 14 illustrates an embodiment of a lifting mechanism, according to various embodiments of the invention.

FIG. 14 illustrates an embodiment of the lifting mechanism 1215, which includes a lever arm 1410. The lever arm 1410 is connected to actuator 1210. When actuated, the lever arm 1410 pulls up the wire/connector 1280, which lifts the dipper mechanism 1265a. The lifting of the dipper mechanism 1286a results in the transport of a dose of cryogenic liquid from the reservoir to the delivery funnel 1275. The interior of dipper mechanism 1265a is optionally hollow, such that, when the dipper mechanism 1265a pivots, cryogenic liquid can flow from scoop in the dipper head 1265b through the dipper "tail" and into the delivery funnel 1275.

FIGS. 15A-H illustrate alternative embodiments of liquid nitrogen dosing system 1110 including different structures for delivering cryogenic liquid from the bottom of liquid nitrogen dosing system 1110. In some of the illustrated embodiments actuating valve 1225 is above the cryogenic liquid to minimize heat transfer and allow for easier cleaning. Note that liquid nitrogen introduction elements such as sensor 1260 and actuating valve 1225 are not shown in these figures for clarity.

Figure 15A:
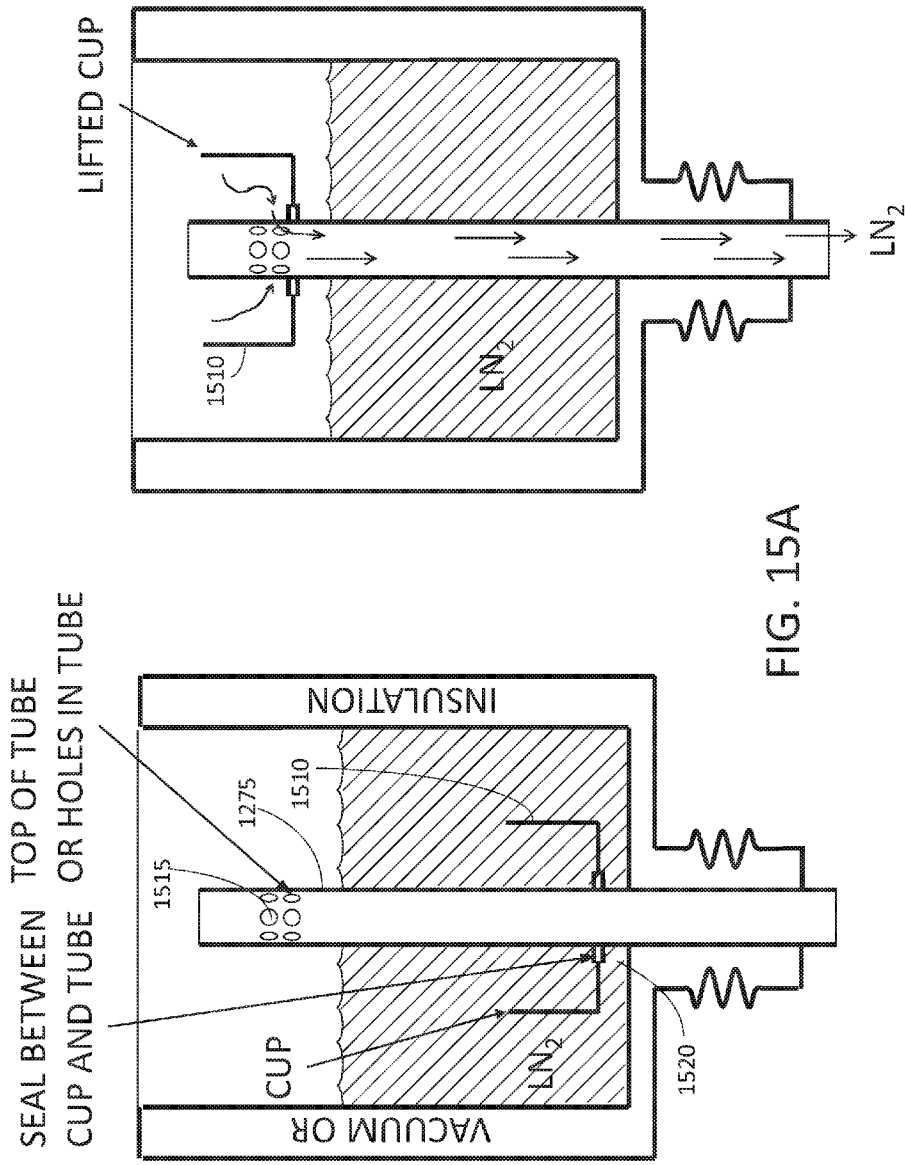
FIGS. 15A-15G illustrate alternative embodiments of a liquid nitrogen dosing system.

In the embodiments illustrated by FIG. 15A a cup 1510 of cryogenic liquid is emptied into funnel 1275 by being raised up and down. The funnel 1275 optionally includes holes 1515 through which the cryogenic liquid can flow. A seal 1520 is optionally used to close an opening between the cup 1510 and funnel 1275.

Figure 15B:
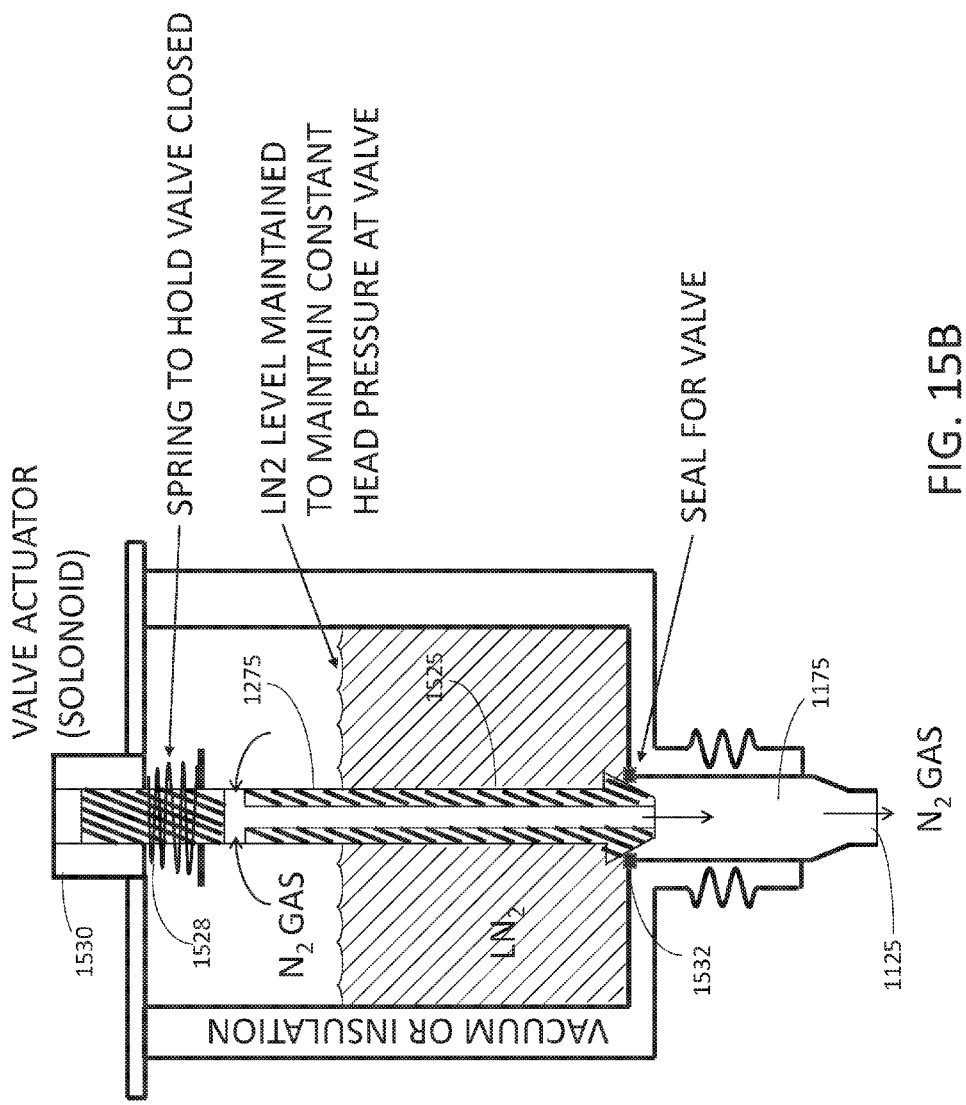

In the embodiments illustrated by FIG. 15B a hollow valve shaft 1525 is used to control flow of cryogenic liquid into funnel 1275. The hollow valve shaft 1525 is configured to allow gas evaporated from the cryogenic liquid to enter the funnel 1275 when the valve is closed. This keeps the interior of the system at near atmospheric pressure and can also serve to purge and/or precool output pipe 1125. A spring 1528 is configured to hold the hollow valve shaft 1525 down (closed to liquid but open to gas) in a default position. The hollow valve shaft 1525 rests in a seal 1532 at the bottom of liquid nitrogen dosing system 1110. The hollow valve shaft 1525 is optionally open at both ends such that gas can vent in both directions. The valve is opened to liquid flow by activation of a solenoid 1530 connected to the hollow valve shaft 1525.

Figure 15C:
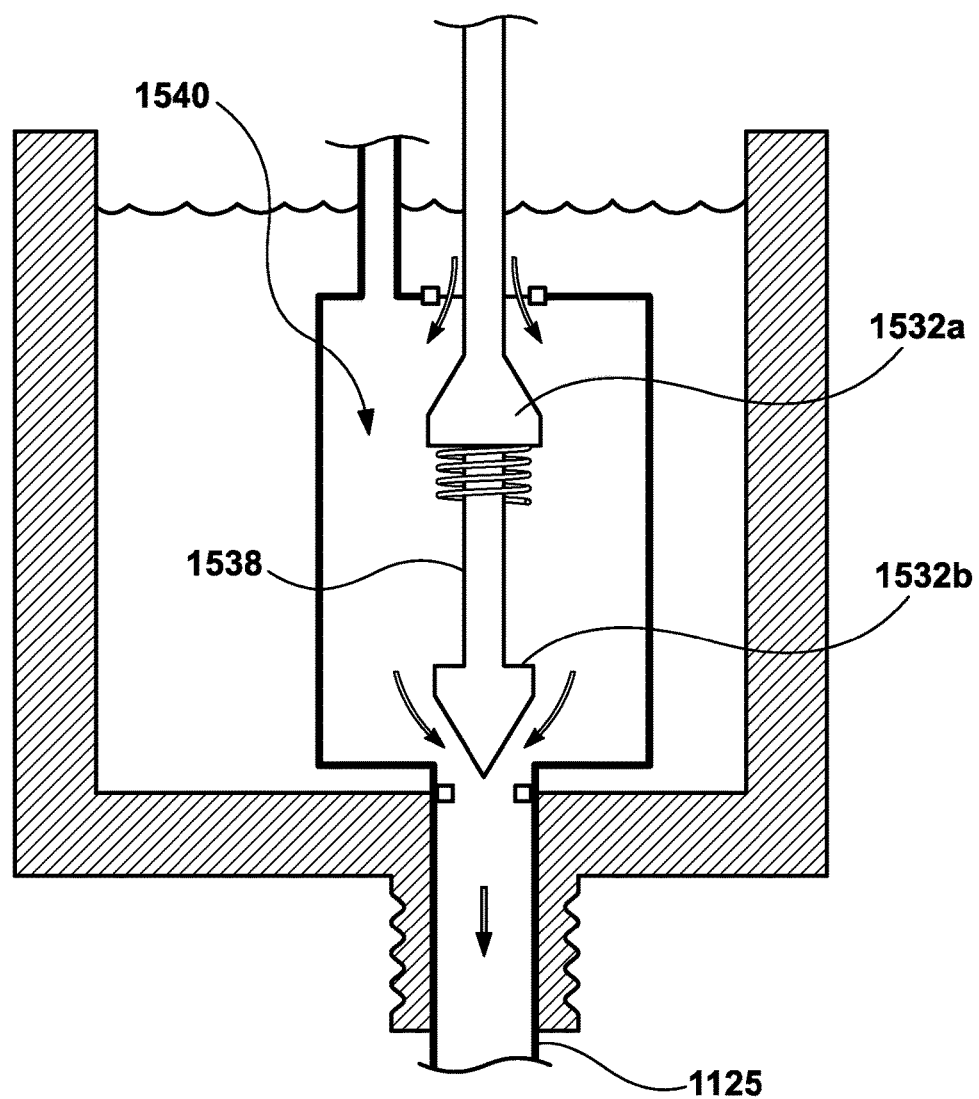

FIG. 15C illustrates an embodiment including two valves 1535a and 1535b on a single shaft 1538. When shaft 1538 is lowered valve 1535a is opened and valve 1535b is closed. This allows a controlled volume of cryogenic liquid to flow into a container 1540. The container 1540 is vented to the atmosphere and thus near atmospheric pressure. When the shaft 1538 is raised valve 1538a is closed and valve 1535b is opened. This allows the controlled volume to flow into funnel 1275 under the force of gravity.

Figure 15D:
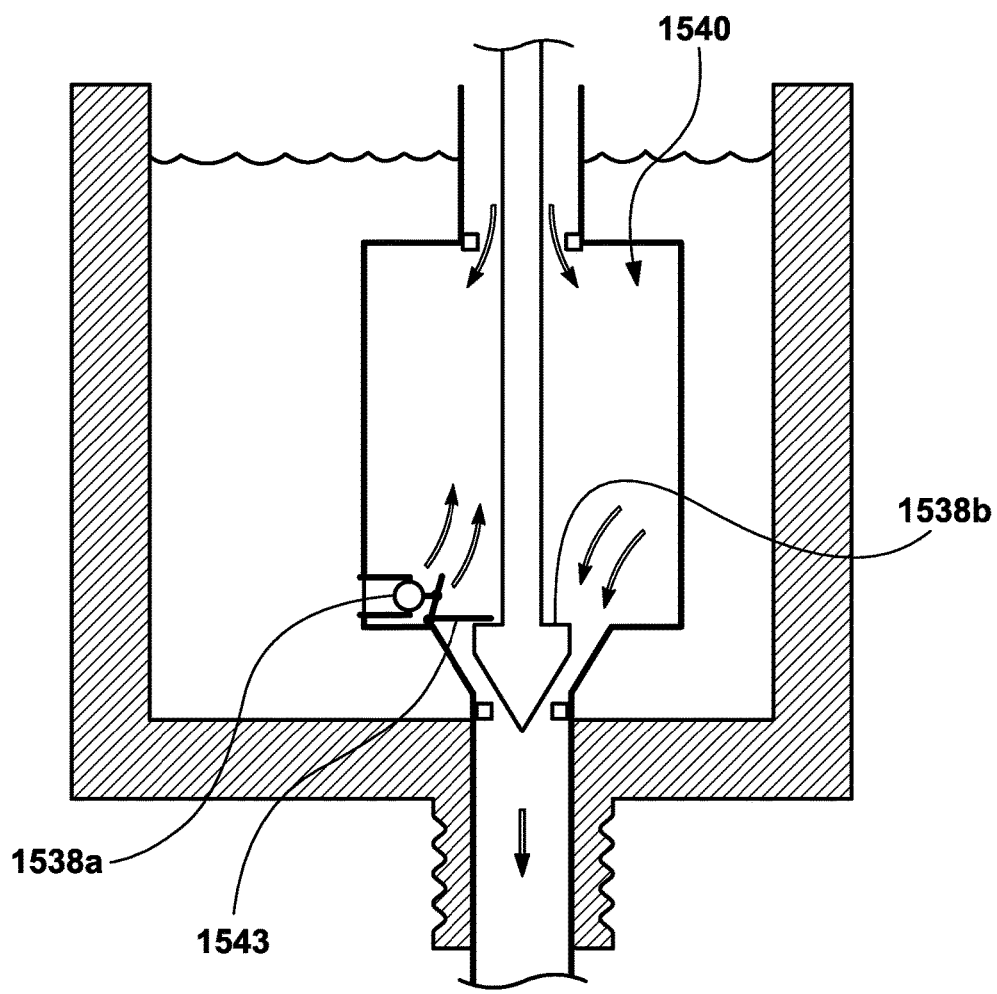

FIG. 15D illustrates an embodiment including two different valves 1538a and 1538b. When valve 1538b is closed, valve 1538a is opened allowing cryogenic liquid to fill container 1540. The opening and closing of valve 1538b is controlled by a trigger 1543 coupled to the shaft of valve 1538a. Valve 1538b is opened by raising shaft 1525, for example using lifting mechanism 1215. Opening valve 1538b allows the cryogenic liquid to flow of container 1540 to funnel 1275, and also closes valve 1538a.

Figure 15E:
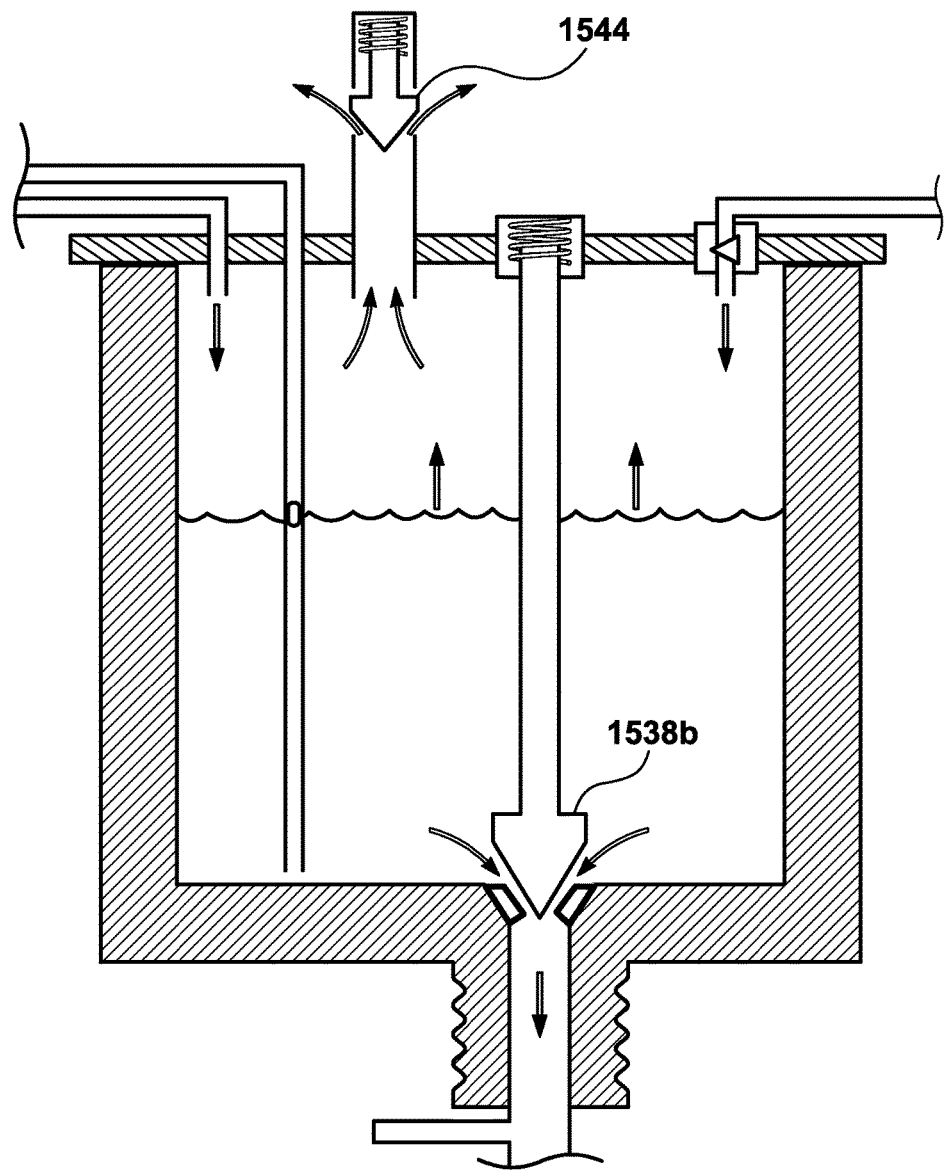

FIG. 15E illustrates embodiments in which the interior of liquid nitrogen dosing system 1110 is maintained at above atmospheric pressure, and this pressure facilitates flow of cryogenic cooling liquid through output pipe 1125 to container 3. These embodiments include a pressure relief valve 1544 configured to maintain a steady pressure within the interior of liquid nitrogen dosing system 1110. Because this pressure is maintained, the flow of cryogenic cooling liquid to funnel 1275 when valve 1538b is opened is reproducible. In various embodiments pressure relief valve 1544 is configured to maintain pressures of less than or equal to 5, 10 or 15 psi above atmospheric pressure. In some embodiments pressure relief valve 1544 is adjustable. Gas released from pressure relief valve 1544 is optionally routed to outlet pipe 1125 for cooling and/or purging.

Figure 15F:
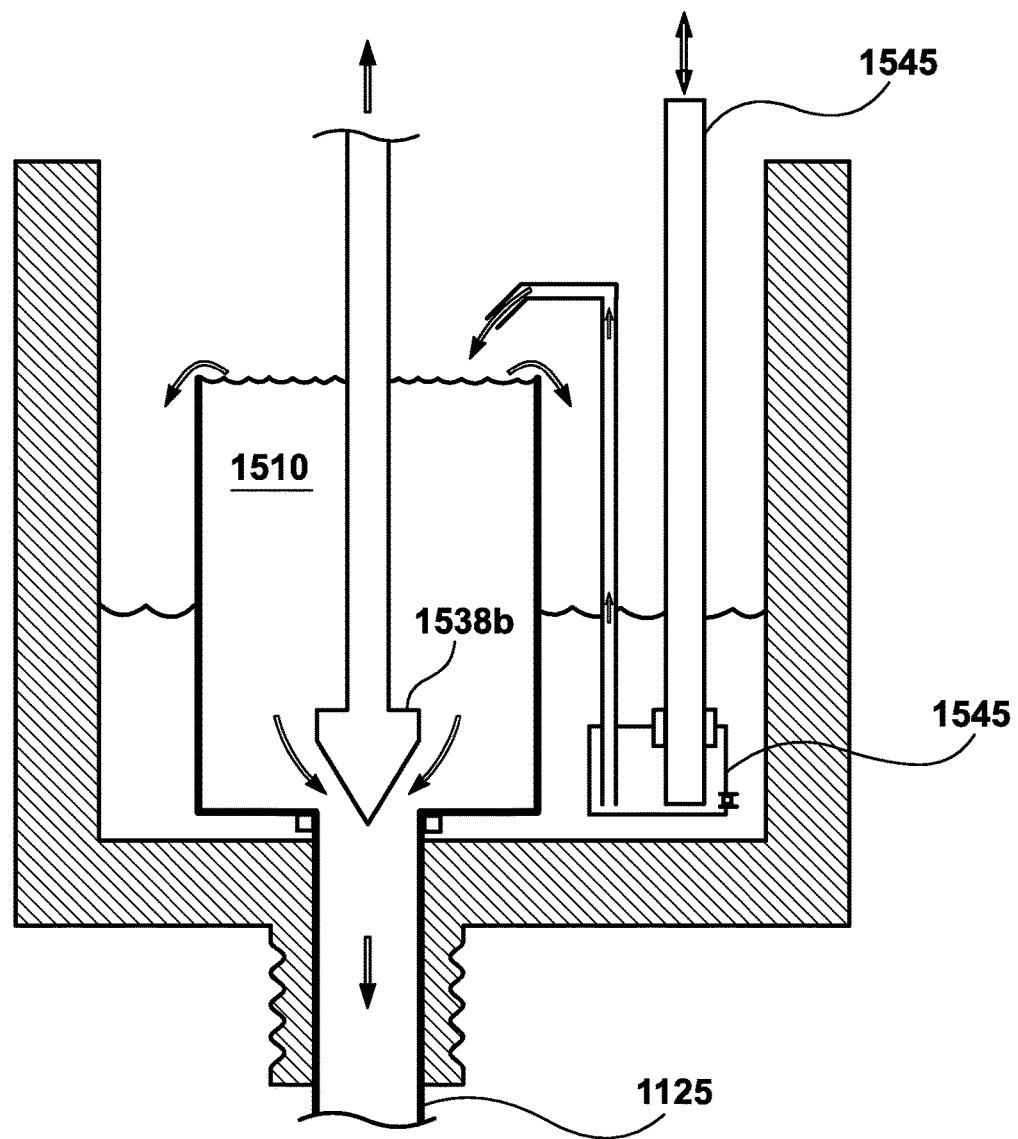

FIG. 15F illustrates embodiments which cup 1510 is filled to overflowing. As a result when valve 1538b is opened a volume of cryogenic liquid equal to the volume of cup 1510 is transferred to output pipe 1125. All or part of this volume can be provided in a sequence of doses by opening and closing valve 1538*b*. Because the cup is at approximately atmospheric pressure and the flow is gravity fed, the volume of each dose is proportional to a length of time valve 1538*b* is open. Cup 1510 is filled using a pump 1545 such as the piston pump illustrated in FIG. 15F. The delivery of additional cryogenic liquid into cup 1510 is avoided when the cup 1510 is being emptied.

Figure 15G:
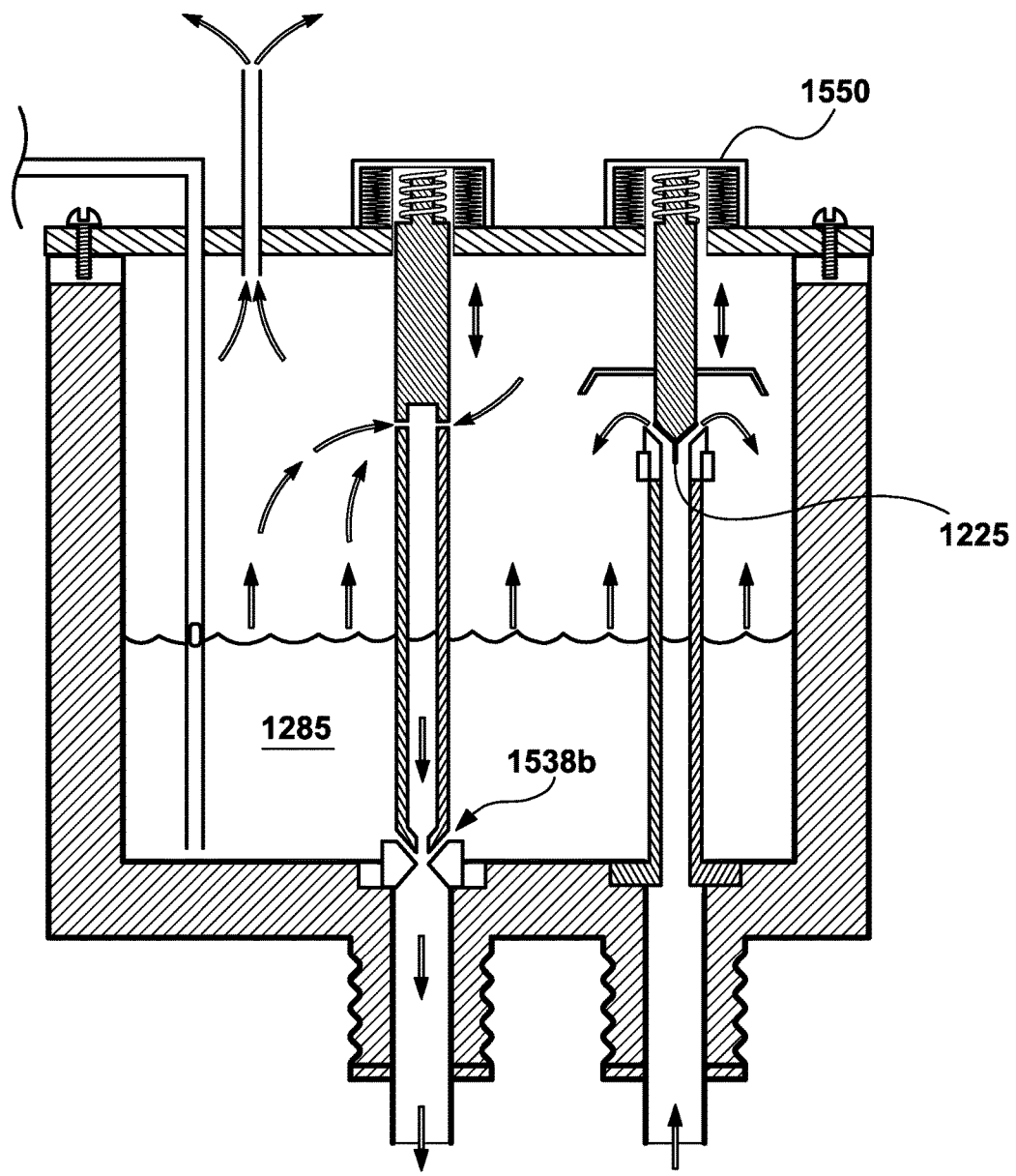

FIG. 15G illustrates embodiments including an actuating valve 1225 disposed within the interior of liquid nitrogen dosing system 1110, e.g. within reservoir 1285. Having actuating valve 1225 inside and exposed to the vapor of the liquid nitrogen reduces warming and boiling of the cryogenic liquid as the liquid passes though the valve. Actuating valve 1225 is opened and closed using a solenoid 1550. In the embodiments illustrated valve 1538*a*, configured to release cryogenic liquid to outlet pipe 1125, includes the structures illustrated in FIG. 15B. However, other embodiments of valve 1538*a* discussed herein may be used in combination with the actuating valve 1225 illustrated in FIG. 15G. Solenoid 1550, and the other solenoids illustrated herein, optionally includes a bellows to separate electronic components of solenoid 1550 from the cryogenic liquid and vapor thereof.

Figure 16:
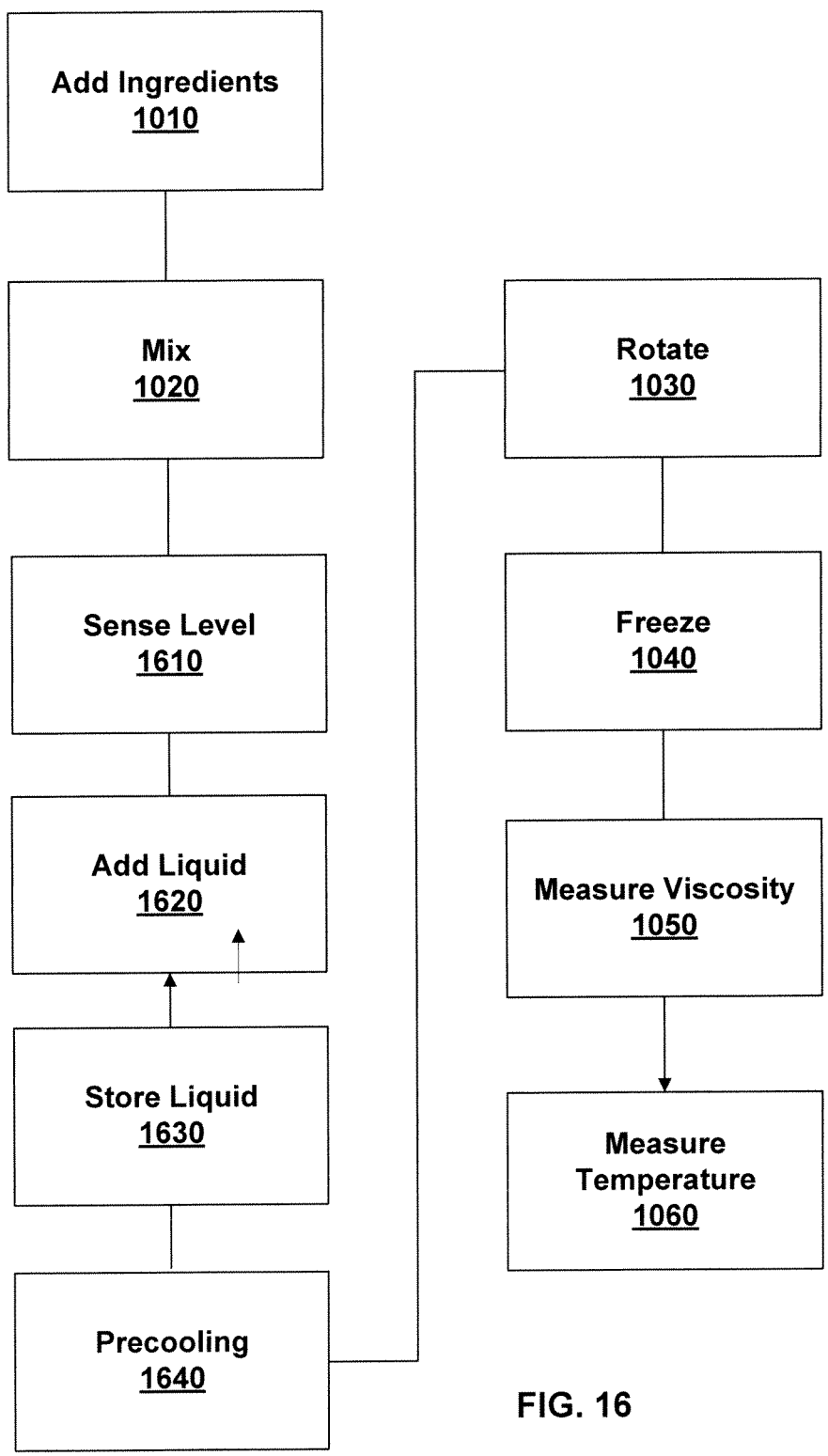
FIG. 16 illustrates methods of making ice cream, according to various embodiments of the invention.

FIG. 16 illustrates methods of making ice cream, according to various embodiments of the invention. These methods are optionally performed using the embodiments illustrated by FIG. 11, and are optionally performed at part of the methods illustrated in FIG. 10. Add ingredients step 1010, in which placing ingredients in container 3, is discussed elsewhere herein. Mix step 1020 is also discussed elsewhere herein. In Mix step 1020 the ingredients are mixed using one or more beaters 2 disposed within the container 3.

In a sense level step 1610, a level of liquid nitrogen or another cryogenic liquid within a liquid nitrogen dosing system 1110 is sensed using level sensor 1260.

In an add liquid step 1620, liquid nitrogen or other cryogenic liquid is added to the liquid nitrogen dosing system 1110 from a pressurized liquid supply. The addition is optionally controlled by actuating valve 1225 and responsive to the level sensor 1260.

In a store liquid step 1630 the liquid nitrogen or other cryogenic liquid is stored in the reservoir 1285 of liquid nitrogen dosing system 1110. This storage may be at approximately atmospheric pressure or at a controlled pressure. The pressure is optionally controlled by a relief valve 1544.

In an optional precooling step 1640, output pipe 1125 is precooled. This is optionally accomplished using a gas of the liquid nitrogen or other cryogenic liquid stored in the liquid nitrogen dosing system 1110. Precooling step 1640 may be a continuous process in which the gas flows through output pipe 1125 to both cool and purge.

Rotate Step 1030, is discussed elsewhere herein, and includes rotating container 3 and/or one or more of beaters 2.

Dispense step 1650 includes dispensing the added liquid nitrogen from the liquid nitrogen dosing system 1110 into the container 3 in a controlled amount. Dispense step 1650 can occur during Mix Step 1020, Rotate Step 1030, freeze step 1040, measure viscosity step 1050, and/or measure temperature step 1060, for example. Dispense step 1650 typically results in cooling and/or freezing of the ingredients. Dispense step 1650 optionally occurs in one or more doses as controlled by control circuit 510. The liquid dispensed in dispense step 1650 has been separated from the vapor of this liquid. This greatly improves the mass and volumetric precision of each dose. As discussed elsewhere herein, the amount of cryogenic liquid dispensed in dispense step 1650 is optionally responsive to viscosity measurement, recipe, temperature, etc.

Measure Viscosity Step 1050 and Measure Temperature Step 1060 are discussed elsewhere herein.

Several embodiments are specifically illustrated and/or described herein. However, it will be appreciated that modifications and variations are covered by the above teachings and within the scope of the appended claims without departing from the spirit and intended scope thereof. For example, while ice cream is discussed herein, alternative embodiments of the invention may be applied to frozen yogurt or other frozen foods. In some embodiments one of the interlocking beaters is held stationary while the other is rotated. The use of gravity fed cryogenic liquids to freeze ingredients of frozen food products enables more reproducible dosing of liquid coolants, and thus a more reproducible product, relative to systems in which cryogenic liquids are provided at unpredictable pressures.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
    a container mount;
    a container having a bottom and sides configured to hold ingredients, the container configured to attach to the container mount;
    a coolant dosing system configured to provide a controlled amount of coolant to the ingredients in the container; and
    first and second beaters configured to mix the ingredients in the container, each of the first and second beaters configured to scrape the ingredients from a surface of the other of the first and second beaters and configured to scrape the ingredients from the sides and the bottom of the container, the first and second beaters being disposed to pass within a distance of each other, the distance being sufficient to cause the first and second beaters to scrape the ingredients from the surface of the other of the first and second beaters.

2. The system of claim 1, wherein each of the first and second beaters comprises:
    a shaft; and
    a helical spiral.

3. The system of claim 2, wherein the helical spirals of the first and second beaters are positioned such that an outer edge of at least one of the helical spirals is less than $3/16^{th}$ inches from the side of the container and a bottom of each of the helical spirals is less than $3/16^{th}$ inches from the bottom of the container.

4. The system of claim 2, wherein the helical spiral of the first beater overlaps with the helical spiral of the second beater such that an outer edge of the helical spiral of the first beater is positioned less than ¼ inches from the shaft of the second beater and such that an outer edge of the helical spiral of the second beater is positioned less than ¼ inches from the shaft of the first beater.

5. The system of claim 2, wherein, for each of the first and second beaters, a upper part and a bottom part of the helical spiral being connected to the shaft.

6. The system of claim 5, further comprising a motor configured to rotate the first and second beaters, wherein the first and second beaters are configured such that, as the motor rotates the first and second beaters, the helical spiral of each of the first and second beaters moves in a downward direction such that the helical spirals push the ingredients downward toward the bottom of the container.

7. The system of claim 6, wherein the motor is configured to rotate the first and second beaters at a same speed and in a same direction.

8. The system of claim 6, the helical spiral of each of the first and second beaters having a pitch of the helical spiral, a diameter of the helical spiral, and a wire diameter selected to maintain the distance as the first and second beaters are rotated by the motor, wherein the distance is less than $3/16^{th}$ inches.

9. The system of claim 2, wherein the helical spirals of the first and second beaters are positioned such that a bottom region of each of the helical spirals is less than $3/16^{th}$ inches from the bottom of the container.

10. The system of claim 9, wherein the bottom region of the helical spiral of each of the first and second beaters is straight and is parallel to the bottom of the container, and wherein the bottom of the container is flat.

11. The system of claim 9, wherein a taper of the bottom region of the helical spiral of each of the first and second beaters matches a taper of the bottom of the container.

12. A device for making a frozen confection, the device comprising:
a container having a bottom and sides configured to hold ingredients;
first and second beaters configured to mix the ingredients in the container, each of the first and second beaters comprising:
a shaft, and
a helical spiral secured to the shaft; and
a motor configured to rotate the first and second beaters, each of the first and second beaters positioned such that, during rotation by the motor:
a surface of the first and second beaters passes within a first distance of a surface of the other of the first and second beaters to scrape the ingredients from the surface of the other of the first and second beaters,
a bottom surface of each of the first and second beaters passes within a second distance of the bottom of the container to scrape the ingredients from the bottom of the container,
an outer edge of at least one of the first and second beaters passes within a third distance of the sides of the container to scrape the ingredients from the sides of the container, and
wherein the helical spirals of the first and second beaters positioned such that an outer edge of one of the helical spirals is less than $3/16^{th}$ inches from the sides of the container and a bottom of each of the helical spirals is less than $3/16^{th}$ inches from the bottom of the container.

13. The device of claim 12, wherein the first and second beaters are configured such that, as the motor rotates the first and second beaters, the helical spiral of each of the first and second beaters moves in a downward direction such that the helical spiral of each of the first and second beaters pushes the ingredients downward toward the bottom of the container.

14. The device of claim 12, wherein:
a diameter of each of the helical spirals is greater than a radius of the container.

15. The device of claim 12, wherein the motor is configured to rotate the first and second beaters in a first direction, the device further comprising:
a container mount;
an additional motor configured to rotate the container mount in a second direction opposite the first direction; and
a control circuit configured to control the motor and the additional motor.

16. The device of claim 15 wherein the control circuit controls the speed of rotation of the container mount.

17. A mixer, comprising:
first and second beaters configured to mix ingredients in a container, each of the first and second beaters comprising:
a shaft, and
a helical spiral having a pitch of the spiral, a diameter of the spiral, and a wire diameter,
wherein the helical spiral of the first beater overlaps with the helical spiral of the second beater; and
a motor configured to rotate the first and second beaters at a same speed and in a same direction, each of the first and second beaters positioned such that, during rotation by the motor, a surface of the first and second beaters passes within a distance of a surface of the other of the first and second beaters to scrape the ingredients from the surface of the other of the first and second beaters.

18. The mixer of claim 17, wherein the pitch of the spiral, the diameter of the spiral, and the wire diameter are selected to maintain the distance as the first and second beaters are rotated by the motor, wherein the distance is less than $3/16^{th}$ inches.

19. The mixer of claim 17, wherein the helical spiral of the first beater overlaps with the helical spiral of the second beater such that an outer edge of the helical spiral of the first beater is positioned less than ¼ inches from the shaft of the second beater and such that an outer edge of the helical spiral of the second beater is positioned less than ¼ inches from the shaft of the first beater.

20. The mixer of claim 17, wherein the first and second beaters are configured such that, as the motor rotates the first and second beaters, the helical spiral of each of the first and second beaters moves in a downward direction such that the helical spirals push the ingredients downward toward the bottom of the container.

\* \* \* \* \*